(12) United States Patent
Agresti et al.

(10) Patent No.: US 12,448,729 B2
(45) Date of Patent: Oct. 21, 2025

(54) VEHICLE WHEELS AND TYRE COMPRISING SAID METALLIC REINFORCING CORD

(71) Applicant: Pirelli Tyre S.p.A., Milan (IT)

(72) Inventors: Simone Agresti, Milan (IT); Guido Luigi Daghini, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

(21) Appl. No.: 18/044,435

(22) PCT Filed: Sep. 24, 2021

(86) PCT No.: PCT/IB2021/058714
§ 371 (c)(1),
(2) Date: Mar. 8, 2023

(87) PCT Pub. No.: WO2022/064436
PCT Pub. Date: Mar. 31, 2022

(65) Prior Publication Data
US 2023/0366149 A1 Nov. 16, 2023

(30) Foreign Application Priority Data
Sep. 25, 2020 (IT) .................. 102020000022654

(51) Int. Cl.
*D07B 1/06* (2006.01)
*B60C 9/00* (2006.01)

(52) U.S. Cl.
CPC ............ *D07B 1/062* (2013.01); *B60C 9/0007* (2013.01); *B60C 2009/0092* (2013.01);
(Continued)

(58) Field of Classification Search
CPC .................. D07B 1/062; D07B 1/0646; D07B 2201/2039; D07B 2501/2046; B60C 2009/0092; B60C 2009/2077
See application file for complete search history.

(56) References Cited

U.S. PATENT DOCUMENTS 1,815,779 A 7/1931 Fritz
2,387,320 A 10/1945 Foster
(Continued)

FOREIGN PATENT DOCUMENTS

CN 1165221 A 11/1997
CN 1229866 A 9/1999
(Continued)

OTHER PUBLICATIONS

Hayashi, English Machine Translation of JP 2009062655, 2009 (Year: 2009).*
(Continued)

*Primary Examiner* — Bao-Thieu L Nguyen
(74) *Attorney, Agent, or Firm* — Finnegan, Henderson, Farabow, Garrett & Dunner, L.L.P.

(57) ABSTRACT

The invention relates to a metallic reinforcing cord (10) for tyres for vehicle wheels, comprising from two to ten metallic wires (11) twisted together with a twisting pitch (P) and each having a predetermined diameter. In at least some cross sections of the metallic reinforcing cord (10), at least two of said metallic wires (11) are arranged to a minimum mutual distance greater than, or equal to, 2.5 times the predetermined diameter.

13 Claims, 13 Drawing Sheets

(52) U.S. Cl.
CPC .............. *D07B 2201/1044* (2013.01); *D07B 2201/2006* (2013.01); *D07B 2201/2039* (2013.01); *D07B 2501/2046* (2013.01)

(56) References Cited

U.S. PATENT DOCUMENTS

| | | | |
|---|---|---|---|
| 3,399,521 A | 9/1968 | Thoma et al. | |
| 4,197,894 A | 4/1980 | Boileau | |
| 4,333,306 A * | 6/1982 | Yamashita | D07B 1/062 57/902 |
| 4,334,215 A | 6/1982 | Frazier et al. | |
| 4,606,392 A | 8/1986 | Weidenhaupt et al. | |
| 4,718,470 A * | 1/1988 | Kusakabe | B60C 9/0007 57/902 |
| 4,836,262 A * | 6/1989 | Nishizawa | D07B 1/0646 57/902 |
| 4,862,486 A | 8/1989 | Wing et al. | |
| 5,062,161 A | 11/1991 | Sutton | |
| 5,135,039 A * | 8/1992 | Mizuta | B60C 9/0007 152/451 |
| 5,162,067 A * | 11/1992 | Miyawaki | B60C 9/0007 57/200 |
| 5,213,652 A * | 5/1993 | Katoh | D07B 1/062 57/200 |
| 5,223,060 A * | 6/1993 | Imamiya | D07B 1/062 57/902 |
| 5,293,737 A * | 3/1994 | Kobayashi | D07B 1/0646 57/902 |
| 5,295,346 A * | 3/1994 | Bundo | D07B 1/0646 57/902 |
| 5,337,549 A * | 8/1994 | Kobayashi | B60C 9/0057 57/902 |
| 5,502,960 A * | 4/1996 | Kobayashi | B60C 9/0057 57/902 |
| 5,505,243 A * | 4/1996 | Imamiya | D07B 1/0646 57/902 |
| 5,584,169 A * | 12/1996 | Ikehara | B60C 9/0007 57/902 |
| 5,802,830 A * | 9/1998 | Kawatani | B60C 9/0007 57/902 |
| 5,843,583 A | 12/1998 | D'Haene et al. | |
| 6,425,428 B1 * | 7/2002 | Onuma | B60C 9/2006 57/902 |
| 10,793,979 B2 | 10/2020 | Ridley | |
| 11,771,546 B2 | 10/2023 | Lima | |
| 2001/0013385 A1 | 8/2001 | Ohya | |
| 2002/0009608 A1 * | 1/2002 | Nishikawa | D07B 1/062 152/451 |
| 2002/0187345 A1 | 12/2002 | Andrews | |
| 2003/0010418 A1 | 1/2003 | Miyazaki et al. | |
| 2003/0046919 A1 | 3/2003 | Noferi | |
| 2003/0192157 A1 | 10/2003 | Andrews | |
| 2005/0069685 A1 | 3/2005 | Andrews | |
| 2005/0183808 A1 * | 8/2005 | Barguet | D07B 1/0613 57/220 |
| 2005/0288775 A1 | 12/2005 | Dong | |
| 2006/0150378 A1 | 7/2006 | Andrews | |
| 2009/0176119 A1 | 7/2009 | Cristofani | |
| 2010/0005774 A1 * | 1/2010 | Fukuda | D07B 1/062 57/215 |
| 2010/0206450 A1 | 8/2010 | Fukumoto | |
| 2010/0218872 A1 * | 9/2010 | Ishizaka | B60C 9/005 152/451 |
| 2010/0300576 A1 | 12/2010 | Liu et al. | |
| 2011/0099967 A1 | 5/2011 | Daghini et al. | |
| 2011/0240626 A1 | 10/2011 | Mullebrouck | |
| 2011/0290398 A1 | 12/2011 | Kaoru | |
| 2012/0267025 A1 | 10/2012 | Daghini | |
| 2013/0048185 A1 | 2/2013 | Harikae et al. | |
| 2013/0118668 A1 | 5/2013 | Ascanelli et al. | |
| 2014/0083590 A1 | 3/2014 | Ascanelli | |
| 2014/0338810 A1 | 11/2014 | Daghini et al. | |
| 2015/0097662 A1 | 4/2015 | Yu et al. | |
| 2015/0122395 A1 | 5/2015 | Misani et al. | |
| 2016/0318343 A1 * | 11/2016 | Daghini | B60C 9/005 |
| 2017/0027247 A1 | 2/2017 | Lim | |
| 2017/0313133 A1 | 11/2017 | Ascanelli et al. | |
| 2018/0291535 A1 | 10/2018 | Ridley | |
| 2018/0347078 A1 | 12/2018 | Goenka et al. | |
| 2018/0347080 A1 | 12/2018 | Goenka et al. | |
| 2019/0275835 A1 | 9/2019 | Rampana et al. | |
| 2021/0000587 A1 | 1/2021 | Lima | |
| 2021/0309050 A1 * | 10/2021 | Cornille | B60C 9/0007 |
| 2022/0371367 A1 * | 11/2022 | Agresti | D07B 1/062 |
| 2023/0001741 A1 | 1/2023 | Agresti et al. | |
| 2023/0366149 A1 | 11/2023 | Agresti | |

FOREIGN PATENT DOCUMENTS

| | | |
|---|---|---|
| CN | 1280639 A | 1/2001 |
| CN | 1703551 A | 11/2005 |
| CN | 1708415 A | 12/2005 |
| CN | 1743188 A | 3/2006 |
| CN | 1965126 A | 5/2007 |
| CN | 103958218 A | 12/2011 |
| CN | 102369321 A | 3/2012 |
| CN | 102471998 A | 5/2012 |
| CN | 102639337 A | 8/2012 |
| CN | 102666133 A | 9/2012 |
| CN | 102971459 A | 3/2013 |
| CN | 103025543 A | 4/2013 |
| CN | 203498695 U | 3/2014 |
| CN | 104023997 A | 9/2014 |
| CN | 104343026 A | 2/2015 |
| CN | 107000483 A | 8/2017 |
| CN | 206646324 U | 11/2017 |
| CN | 109952209 A | 6/2019 |
| DE | 102012214866 A1 | 2/2013 |
| EP | 0125518 A2 | 11/1984 |
| EP | 0376272 A1 | 7/1990 |
| EP | 1 112 868 A2 | 7/2001 |
| EP | 1126074 A2 | 8/2001 |
| EP | 1213159 A2 | 6/2002 |
| EP | 1270270 A1 | 1/2003 |
| EP | 2218588 A1 | 8/2010 |
| EP | 2261058 A1 | 12/2010 |
| JP | 559677 A | 3/1993 |
| JP | H07279071 A | 10/1995 |
| JP | 2006183211 A | 7/2006 |
| JP | 2007145125 A | 6/2007 |
| JP | 2009-62655 | 3/2009 |
| JP | 2010180483 A | 8/2010 |
| JP | 2010264878 A | 11/2010 |
| KR | 101194309 B1 | 10/2012 |
| WO | 2006010658 A1 | 2/2006 |
| WO | WO 2007/128335 A1 | 11/2007 |
| WO | 2012017399 A1 | 2/2012 |
| WO | WO 2012/055677 A2 | 5/2012 |
| WO | 2013098735 A1 | 7/2013 |
| WO | 2014083535 A2 | 6/2014 |
| WO | 2015014639 A2 | 2/2015 |
| WO | 2015097609 A1 | 7/2015 |
| WO | 2020021006 A1 | 1/2020 |

OTHER PUBLICATIONS

International Search Report form the European Patent Office in corresponding International Application No. PCT/IB2021/058714 mailed Dec. 21, 2021.

Written Opinion of the International Searching Authority from the European Patent Office in corresponding International Application No. PCT/IB2021/058714 mailed Dec. 21, 2021.

Office Action issued by the European Patent Office on Nov. 15, 2024, in corresponding European Application No. 21 783 355.7 (6 pages).

International Search Report form the European Patent Office in corresponding International Application No. PCT/IB2020/062006 mailed Feb. 10, 2021.

(56) References Cited

OTHER PUBLICATIONS

Written Opinion of the International Searching Authority from the European Patent Office in corresponding International Application No. PCT/IB2020/062006 mailed Feb. 10, 2021.
Notification of the First Office Action dated Feb. 15, 2023, from China National Intellectual Property Administration, in counterpart Chinese Application No. 202080086028.5.
XP055808009, Nokian Tyres: "Reinforcing Materials in Rubber Products", aroverket.com/, Mar. 1, 2015 (Mar. 1, 2015), Retrieved on May 27, 2021 from the Internet: URL :https://laroverket.com/wp-content/uploads/2015/03/reinforcing_materials.pdf.
Office Action issued by the European Patent Office on Dec. 7, 2023, in corresponding European Application No. 20 823 709.9 (7 pages).
Office Action issued by the European Patent Office on Oct. 4, 2024, in corresponding European Application No. 20823709.9 (7 pages).
Notification of the First Office Action issued by the China National Intellectual Property Administration on Jul. 18, 2023, in Chinese Application No. CN 202080085859.0 (10 pages) with English translation.
Third Party Observations issued by the European Patent Office on Oct. 6, 2023, in European Application No. 20823709.9 (12 pages).
International Search Report form the European Patent Office in corresponding International Application No. PCT/IB2020/062014 mailed Mar. 3, 2021.
Written Opinion of the International Searching Authority from the European Patent Office in corresponding International Application No. PCT/IB2020/062014 mailed Mar. 3, 2021.
Notice of Allowance issued by the China National Intellectual Property Administration on May 23, 2024, in corresponding Application No. CN 202080085884.9 (5 pages).
Office Action issued by the European Patent Office on Jan. 18, 2024, in European Application No. EP 20 838 618.5 (6 pages).
Notification of the Second Office Action issued by the China National Intellectual Property Administration on Feb. 29, 2024, in corresponding Application No. CN 202080085884.9 (9 pages).
Notification of the First Office Action issued by the China National Intellectual Property Administration on May 30, 2023, in corresponding Application No. CN 202080085884.9 (9 pages) and English translation.
International Search Report form the European Patent Office in corresponding International Application No. PCT/IB2020/062035 mailed Mar. 1, 2021.
Written Opinion of the International Searching Authority from the European Patent Office in corresponding International Application No. PCT/IB2020/062035 mailed Mar. 1, 2021.
Notice of Allowance from Chinese Application No. 202080085859.0 issued May 2, 2024 (6 pages).
Third Party Observations issued by the European Patent Office on Apr. 10, 2024, in European Application No. 20823709.9 (7 pages).
Office Action issued by the European Patent Office on Oct. 11, 2024, in European Application No. 20 823 709.9 (9 pages).

* cited by examiner

VEHICLE WHEELS AND TYRE COMPRISING SAID METALLIC REINFORCING CORD

This application is a national stage filing under 35 U.S.C. § 371 of International Application No. PCT/IB2021/058714, filed on Sep. 24, 2021, and claims priority to Italian Application No. 102020000022654, filed Sep. 25, 2020; the contents of each application is incorporated herein by reference in its entirety.

The present invention relates to a metallic reinforcing cord for tyres for vehicle wheels.

The invention also relates to a tyre for vehicle wheels comprising said metallic reinforcing cord.

PRIOR ART

Metallic reinforcing cords for tyres for vehicle wheels are described, for example, in US2003046919 and WO2007128335 to the Applicant and in WO2012055677.

SUMMARY OF THE INVENTION

Hereinafter, when reference is made to any range of values comprised between a minimum value and a maximum value, the aforementioned minimum and maximum values are deemed to be included in the aforementioned range, unless expressly stated to the contrary.

Moreover, all of the ranges include any combination of the described maximum and minimum values and include any intermediate range, even if not expressly specifically described.

Any numerical value is deemed to be preceded by the term "about" to also indicate any numerical value that differs slightly from the one described, for example to take into account the typical dimensional tolerances in the field of reference.

Hereinafter, the following definitions apply.

The term "equatorial plane" of the tyre is used to indicate a plane perpendicular to the rotation axis of the tyre and that divides the tyre into two symmetrically equal parts.

The terms "radial" and "axial" and the expressions "radially inner/outer" and "axially inner/outer" are used with reference, respectively, to a direction substantially parallel to the equatorial plane of the tyre and to a direction substantially perpendicular to the equatorial plane of the tyre, i.e., to a direction substantially perpendicular to the rotation axis of the tyre and to a direction substantially parallel to the rotation axis of the tyre, respectively.

The terms "circumferential" and "circumferentially" are used with reference to the direction of annular extension of the tyre, i.e., to the rolling direction of the tyre, which corresponds to a direction lying on a plane coinciding with or substantially parallel to the equatorial plane of the tyre.

The term "substantially axial direction" is used to indicate a direction inclined, with respect to the equatorial plane of the tyre, by an angle comprised between 70° and 90°.

The term "substantially circumferential direction" is used to indicate a direction oriented, with respect to the equatorial plane of the tyre, at an angle comprised between 0° and 10°.

The expressions "upstream" and "downstream" are used with reference to a predetermined direction and to a predetermined reference. Therefore, assuming a direction from left to right and a reference taken along said direction, a position "downstream" with respect to the reference indicates a position to the right of said reference and a position "upstream" with respect to the reference indicates a position to the left of said reference.

The term "elastomeric material" is used to indicate a material comprising a vulcanizable natural or synthetic polymer and a reinforcing filler, wherein such a material, at room temperature and after having been subjected to vulcanization, can undergo deformations caused by a force and is capable of quickly and energetically recovering the substantially original shape and size after the elimination of the deforming force (according to the definitions of standard ASTM D1566-11 Standard Terminology Relating To Rubber).

The term "metallic reinforcing cord" is used to indicate an elongated element consisting of one or more elongated elements (also called "wires") made of a metallic material and possibly coated by, or incorporated in, an elastomeric material.

The term "hybrid reinforcing cord" is used to indicate a reinforcing cord comprising at least one metallic wire twisted together with at least one textile yarn. Hereinafter, reference is made to hybrid reinforcing cords to refer in particular to reinforcing cords comprising textile yarns having low modulus, like for example nylon yarns.

The term "mixed textile reinforcing cord" is used to indicate a reinforcing cord comprising at least one textile yarn having low modulus, like for example a nylon yarn, twisted together with at least one textile yarn having high modulus, like for example an aramid yarn.

The term "yarn" is used to indicate an elongated element consisting of the aggregation of a plurality of textile filaments or fibers.

The yarns can have one or more "ends", where the term "end" is used to indicate a bundle of filaments twisted together. Preferably, a single end or at least two ends twisted together are provided.

The term "diameter" of a reinforcing cord, or of a wire, is used to indicate the diameter measured as prescribed by the BISFA E10 method (The International Bureau For The Standardization Of Man-Made Fibres, Internationally Agreed Methods For Testing Steel Tyre Cords, 1995 edition).

In the case of yarns, the term "diameter" is used to indicate the diameter of an ideal circumference that circumscribes all of the filaments that define the yarn. The diameter of a yarn increases as the number of filaments and/or ends of the yarn increases.

The term "thread count" of a layer is used to indicate the number of reinforcing cords per unit length provided in such a layer. The thread count can be measured in cords/dm (number of cords per decimeter).

The term "linear density" or "count" of a cord or of a yarn is used to indicate the weight of the cord or of the yarn per unit length. The linear density can be measured in dtex (grams per 10 km of length).

The term "modulus" of a cord or textile yarn is used to indicate the ratio between tenacity (load or force normalized to the linear density) and elongation measured at any point of a tenacity-elongation curve according to the BISFA standard. Such a curve is drawn by calculating the first derivative of the tenacity-elongation function that defines the aforementioned curve, where the linear density is expressed in Tex. The modulus is therefore expressed in cN/Tex. In a tenacity-elongation graph, the modulus is identified by the slope of the aforementioned curve with respect to the X-axis.

The term "initial modulus" is used to indicate the modulus calculated at the point of origin of the tenacity-elongation curve, i.e., for an elongation equal to zero.

The term "high modulus" is used to indicate an initial modulus equal to or greater than 3000 cN/Tex. The term "low modulus" is used to indicate an initial modulus less than 3000 cN/Tex.

For the measurement of the linear density and of the modulus reference is made to flat wires/yarns, without twists applied in the testing step or twisting step, according to the tests regulated by BISFA.

The terms "breaking load" and "elongation at break" of a reinforcing cord are used to indicate the load and the percentage elongation, respectively, at which the reinforcing cord breaks, evaluated with the BISFA E6 method (The International Bureau For The Standardization Of Man-Made Fibres, Internationally Agreed Methods For Testing Steel Tyre Cords, 1995 edition).

The term "part load elongation" of a reinforcing cord is used to indicate the difference between the percentage elongation obtained by subjecting the reinforcing cord to a traction of 50 N and the percentage elongation obtained by subjecting the reinforcing cord to a traction of 2.5 N. The part load elongation is evaluated with the BISFA E7 method (The International Bureau For The Standardization Of Man-Made Fibres, Internationally Agreed Methods For Testing Steel Tyre Cords, 1995 edition).

The term "rigidity" of a reinforcing cord is used to indicate the resistant moment to bending with a predetermined angle (usually)15° evaluated with the BISFA E8 method (The International Bureau For The Standardization Of Man-Made Fibres, Internationally Agreed Methods For Testing Steel Tyre Cords, 1995 edition).

The term "metallic reinforcing cord having a high elongation", or "HE metallic reinforcing cord", is used to indicate a reinforcing cord that has:
  a) an elongation at break equal to at least 3.5% and, preferably
  b) a part load elongation comprised between 1% and 3%.

The aforementioned feature "a" is calculated with the BISFA E6 method (The International Bureau For The Standardization Of Man-Made Fibres, Internationally Agreed Methods For Testing Steel Tyre Cords, 1995 edition). The aforementioned feature "b" is calculated with the BISFA E7 method (The International Bureau For The Standardization Of Man-Made Fibres, Internationally Agreed Methods For Testing Steel Tyre Cords, 1995 edition).

The term "NT steel wire" (Normal Tensile Steel) is used to indicate a carbon steel wire having a breaking strength of 2800±200 MPa, for example having a breaking strength of at least 2700 MPa for a wire diameter of 0.28 mm.

The term "HT steel wire" (High Tensile Steel) is used to indicate a carbon steel wire having a breaking strength of 3200±200 MPa, for example a breaking strength of at least 3100 MPa for a wire diameter of 0.28 mm.

The term "ST steel wire" (Super Tensile Steel) is used to indicate a carbon steel wire having a breaking strength of 3500±200 MPa, for example a breaking strength of at least 3400 MPa for a wire diameter of 0.28 mm.

The term "UT steel wire" (Ultra Tensile Steel) is used to indicate a carbon steel wire having a breaking strength of 3900±200 MPa, for example a breaking strength of at least 3800 MPa for a wire diameter of 0.28 mm.

The tolerances±200 MPa are indicated to comprise, for each class of steel, the minimum and maximum values of breaking strength due to the various wire diameters (typically the breaking strength value is inversely proportional to the wire diameter), for example for wire diameters comprised between 0.12 mm and 0.40 mm.

The term "mechanical behavior" of a reinforcing cord is used to indicate the reaction offered by the reinforcing cord when subjected to a load (or force). In the case of traction load, such a load results to an elongation that is variable depending on the amount of the load according to a function identified by a particular load-elongation curve. The mechanical behavior depends on the material of the wire(s) and/or yarn(s) used, on the number of such wires/yarns, on their diameter or count and on the possible twisting pitch.

The expression "unravelling" of a reinforcing cord is used to indicate the tendency of single wires and/or yarns of the reinforcing cord not to remain stably woven when the reinforcing cord is subjected to cutting with a cutter. The unravelling is evaluated with the BISFA E3 method (The International Bureau For The Standardization Of Man-Made Fibres, Internationally Agreed Methods For Testing Steel Tyre Cords, 1995 edition).

The term "minimum mutual distance" between two metallic wires is used to indicate the minimum distance between a point of the outer surface of a metallic wire and a point of the outer surface of the other metallic wire along a direction that passes through the aforementioned two points and that diametrically cuts the two metallic wires. Such a line intersects the outer surface of each metallic wire at two diametrically opposite points. The point of each metallic wire that is considered for the measurement of the minimum mutual distance is the one which, among the aforementioned two diametrically opposite points, is closest to the other metallic wire.

The term "adjacent wires" is used to indicate two wires arranged so that the line that joins the center of one wire with the center of the other wire does not intersect further wires. Therefore, when the adjacent wires are incorporated in an elastomeric material, only elastomeric material is provided between said adjacent wires.

The term "high" used with reference to metallic reinforcing cords of the invention should not necessarily be taken in absolute terms but rather also in relative terms with respect to the corresponding features of conventional reinforcing cords having the same construction. Therefore, with reference for example to part load elongations, it is deemed high simply due to the fact that it is greater than that of the corresponding conventional metallic reinforcing cords.

The term "high-performance tyres" is used to indicate tyres which are typically intended to be used in wheels of high and ultra-high performance automobiles. Such tyres are commonly defined as "HP" or "UHP" and they allow speeds of over 200 km/h, up to beyond 300 km/h to be reached. Examples of such tyres are those belonging to classes "T", "U", "H", "V", "Z","W", "Y", according to the E.T.R.T.O. standard—(European Tyre and Rim Technical Organization) and racing tyres, in particular for high-piston displacement four-wheeled vehicles. Typically, the tyres belonging to such classes have section width equal to or greater than 185 mm, preferably comprised between 195 mm and 385 mm, more preferably comprised between 195 mm and 355 mm. Such tyres are preferably mounted on rims having fitting diameters equal to or greater than 13 inches, preferably not greater than 24 inches, more preferably comprised between 16 inches and 23 inches. Such tyres can also be used in vehicles different from the aforementioned automobiles, for example in high-performance sports motorcycles, i.e. motorcycles capable of reaching speeds even greater than 270 km/h. Such motorcycles are those which belong to the category typically identified with the following classifications: hypersport, supersport, sport touring, and for lower speed rating: scooter, road enduro and custom.

The term "tyre for motorcycle wheels" is used to indicate a tyre having a high curvature ratio (typically greater than 0.200), capable of reaching high camber angles during cornering of the motorcycle.

Hereinafter, when reference is made to automobile tyres both tyres for automobiles, like for example the high-performance tyres defined above, and tyres for light load vehicles, for example trucks, vans, campervans, pick-up trucks, typically with total mass at full-load equal to or less than 3500 Kg., are intended. Tyres for heavy load vehicles are thus excluded.

The term "radial carcass structure" is used to indicate a carcass structure comprising a plurality of reinforcing cords each of which being oriented along a substantially axial direction. Such reinforcing cords can be incorporated in a single carcass layer or in a plurality of carcass layers (preferably two) radially juxtaposed to one another.

The term "crossed belt structure" is used to indicate a belt structure comprising a first belt layer including reinforcing cords substantially parallel to one another and inclined with respect to the equatorial plane of the tyre by a predetermined angle and at least one second belt layer arranged in a radially outer position with respect to the first belt layer and including reinforcing cords substantially parallel to one another and oriented with an inclination opposite to the one of the cords of the first layer with respect to the equatorial plane of the tyre.

The term "zero degrees belt layer" is used to indicate a reinforcing layer comprising at least one reinforcing cord wound on the belt structure according to a substantially circumferential winding direction.

The term "structural component" of a tyre is used to indicate any layer of elastomeric material of the tyre including reinforcing cords.

The term "phr" (parts per hundred of rubber) is used to indicate the parts by weight of a particular component or ingredient per 100 parts by weight of an elastomeric polymeric base.

In order to keep down the emissions of $CO_2$ into the atmosphere, the Applicant has been producing for many years tyres for automobile and motorcycle wheels having a low rolling resistance. Such tyres comprise, in the crossed belt structures and/or in the reinforcing structures of the bead indicated below with "chafer" and "flipper", metallic reinforcing cords comprising particularly light steel wires, for example having a diameter equal to 0.22 mm, or 0.20 mm or 0.175 mm.

The choice of the Applicant to use reinforcing cords comprising only steel wires in the aforementioned structural components of the tyre derives from the fact that the steel wires, having a high rigidity and an excellent fatigue resistance, are capable of providing the reinforcing cord, and thus the aforementioned structural components of the tyre, with a high resistance to the high compression or bending stresses to which such structural components are typically subjected during travel of the vehicle on which the tyre is mounted. Moreover, thanks to the high heat conduction capability of the steel, the steel wires have a high thermostability, providing the reinforcing cord with a stable mechanical behavior even in extreme conditions of use, like those typical of high-performance tyres.

The Applicant has also observed that steel ensures a good adhesion of the reinforcing cord to the surrounding elastomeric material, with consequent advantages in terms of structural integrity and quality of the tyre.

However, the Applicant has observed that in order to avoid risks of corrosion of the steel in the case of leakage of water inside the tyre and, at the same time, maximizing the adhesion between steel and elastomeric material, it is advisable to ensure that, at each cross section of the reinforcing cord and, therefore, along the entire longitudinal extension of the reinforcing cord, the elastomeric material surrounds each steel wire as completely as possible. It is therefore desirable for the elastomeric material to be able to penetrate as far as possible into the space defined between the aforementioned steel wires to completely surround each steel wire. This is also in order to limit as much as possible the number of areas of possible mutual contact of the steel wires, which would actually constitute areas of possible formation of fatigue cracks from fretting, at the expense of the structural integrity of the tyre.

The Applicant has thought about how to be able to increase the penetration of the elastomeric material between the metallic wires of the metallic reinforcing cords provided in a structural component of a tyre, so as to maximize the adhesion of the elastomeric material to the metallic wires and the thermostability and resistance to corrosion and fretting phenomena of the metallic reinforcing cords.

According to the Applicant, a greater penetration of the elastomeric material between the metallic wires would also result in a more homogeneous hysteretic behavior of the structural component of the tyre, with consequent reduction of the risks of formation of cracks at the transition areas between metallic wires and elastomeric material.

The Applicant has perceived that, in order to obtain such a greater penetration, it is advisable that, in at least some cross sections of the metallic reinforcing cord, at least some of the aforementioned metallic wires are located sufficiently spaced apart from one another.

According to the Applicant, a sufficient spacing of the aforementioned metallic wires would also make it possible to obtain a more even distribution of the metallic wires in the structural component and, consequently, a more homogeneous and even response of such a structural component to the various stresses to which the tyre is subjected during travel, with consequent benefits in terms of rigidity, driving stability and responsiveness.

The Applicant has found that it is possible to obtain a penetration of the elastomeric material between the metallic wires of the metallic reinforcing cords such as to satisfy the requirements discussed above by providing that, in at least some of the cross sections of the metallic reinforcing cord, at least some of the metallic wires of such a metallic reinforcing cord are spaced apart from one another by a minimum distance greater than, or equal to, more than twice the diameter of the metallic wires.

In particular, the Applicant is convinced that in order to achieve all of the desires discussed above it is advisable for such a minimum mutual distance to be equal to or greater than 2.5 times the diameter of the metallic wires.

The present invention therefore relates, in a first aspect thereof, to a metallic reinforcing cord for tyres for vehicle wheels.

Preferably, the metallic reinforcing cord comprises from two to ten metallic wires twisted together.

Preferably, said metallic wires have a predetermined diameter.

Preferably, in at least some cross sections of the metallic reinforcing cord, at least two of said metallic wires are arranged to a minimum mutual distance greater than, or equal to, 2.5 times said predetermined diameter.

In a second aspect thereof, the present invention relates to a tyre for vehicle wheels.

Preferably, the tyre comprises a reinforcing structure comprising at least one reinforcing layer.

Preferably, said at least one reinforcing layer is delimited by two opposite interface surfaces.

Preferably, said at least one reinforcing layer includes a plurality of metallic reinforcing cords.

Preferably, said plurality of metallic reinforcing cords is arranged between said two opposite interface surfaces.

Preferably, at least some of said metallic reinforcing cords are metallic reinforcing cords according to the first aspect of the invention.

The Applicant believes that a reinforcing cord in accordance with the present invention, in addition to make it possible to satisfy all of the requirements discussed above, also makes it possible to eliminate, or at least limit, the undesired effects caused by the cutting forces typically present inside the structural components of the tyres in which the metallic reinforcing cords are used.

The Applicant has indeed observed that in those tyres in which conventional metallic reinforcing cords are used, the metallic wires are positioned only at a central portion of the thickness of the structural component, such a central portion being arranged between two opposite layers made of only elastomeric material. Such positioning results, during the use of the tyre, in the occurrence of undesired cutting forces at the areas that delimit the aforementioned central portion with respect to each of the aforementioned opposite layers made of only elastomeric material. Such cutting forces cause internal lacerations that compromise the structural integrity of the structural component, and therefore the performance of the tyre.

The Applicant is convinced that, for the same construction of the metallic reinforcing cords, in tyres in which the metallic reinforcing cords of the present invention are used, thanks to the more homogeneous distribution of the metallic wires in the thickness of the structural component due to the greater spacing of the metallic wires, formation of the aforementioned cutting forces is attenuated, thus increasing the rigidity of the tyre with respect to the cutting forces and consequently limiting the undesired effects produced by such forces.

The Applicant also believes that as a consequence of the twisting and the high spacing of the metallic wires, the metallic reinforcing cords of the invention can have part load elongations (and elongations at break) much higher than those of conventional metallic reinforcing cords with the same construction. This makes it possible to use the metallic reinforcing cords of the invention also in the structural components of the tyre (like for example the zero degrees belt layers of tyres for automobiles and motorcycles) where currently, in order to be able to obtain a high part load elongation, textile reinforcing cords having a low modulus are used, like for example nylon reinforcing cords or, where high rigidity at high loads (and therefore high modulus at high loads) is also required, mixed textile reinforcing cords or hybrid reinforcing cords are used.

Moreover, according to the Applicant, the elastomeric material that, due to the spacing of the metallic wires, is arranged between them tends to also behave like a structural component of the reinforcing cord and thus to also provide a contribution in terms of rigidity.

A further advantageous effect linked to the greater uniformity of distribution of the metallic wires in the structural component of the tyre is to be able to increase the twisting pitch of the metallic wires with no risk that unravelling occurs. This makes it possible to achieve an increase in the amount of metallic reinforcing cord produced over the same time (hereinafter such a feature is also indicated as "machine output"), with consequent economic and production advantages.

In both of the aspects discussed above, the present invention can have at least one of the preferred features described below. Such features can therefore be present singularly or in combination with each other, except when expressly stated otherwise.

Preferably, said metallic wires are made of steel. Such steel wires may or may not have the same carbon content.

Preferably, the aforementioned minimum mutual distance is equal to, or greater than, three times the diameter of the metallic wires.

In first embodiments, the metallic reinforcing cord can comprise at least one cross section in which at least some of said metallic wires are in contact with each other.

However, it is possible to actuate provisions suitable for ensuring that in any cross section of the metallic reinforcing cord said at least two metallic wires are spaced apart from one another.

Preferably, such provisions consist of suitably deforming (or preforming or crimping) the metallic reinforcing cord until all of the metallic wires are spaced apart from one another along the entire longitudinal extension of the reinforcing cord. Such a deformation (or preforming or crimping) can be obtained by providing the metallic reinforcing cord with highly accentuated curvatures by passing the reinforcing cord over a plurality of cylinders having a low diameter (for example comprised between 1 and 5 mm) with a predetermined pull.

In some embodiments, deforming the metallic reinforcing cord comprises pulling the metallic reinforcing cord with a traction force that is constant or variable over time. It is possible in this way to adjust as desired the relative spacing of the various metallic wires and, therefore, their distribution in the structural component of the tyre.

Preferably, the at least two of said metallic wires that are arranged to a minimum mutual distance greater than, or equal to, 2.5 times said predetermined diameter are adjacent wires.

In this way, it is possible to make metallic reinforcing cords with a relative spacing of the wires which is different at different cross sections of the metallic reinforcing cord.

As the spacing between the various metallic wires changes, both the penetration of the elastomeric material in the metallic reinforcing cord and the rigidity of the metallic reinforcing cord changes.

Preferably, each of said metallic wires extends along a respective helix, thus providing the reinforcing cord with a helical geometry.

According to the Applicant, such a helical geometry contributes to achieve the desired high penetration of the elastomeric material between the metallic wires. Moreover, the helical geometry contributes to achieve the desired high adhesion of the elastomeric material to the metallic wires, as the mechanical bonding of elastomeric material is better on a helical wire than on a substantially straight wire.

According to the Applicant, the helical geometry also contributes to provide the metallic reinforcing cord with the desired high part load elongation and with the desired high rigidity at high loads. In particular, the reinforcing cord of the invention can have, at low loads, a mechanical behavior comparable to that of textile reinforcing cords having low modulus and, at high loads, a mechanical behavior comparable to that of metallic reinforcing cords. The high part load elongation is a consequence of the stretching of the helix of each metallic wire (in this case the reinforcing cord behaves like a spring), whereas the high rigidity at high loads is a consequence of the high elastic modulus which is typical of the metallic material.

In practice, the Applicant believes that due to the aforementioned helical geometry the metallic reinforcing cord of the invention can have a "double modulus" mechanical behavior which is comparable to the one which is typical of mixed and hybrid textile reinforcing cords where, due to the use of a material having a low modulus and of a material having a high modulus, the mechanical behavior of the reinforcing cord at low loads is mainly dictated by the reaction offered by the material having a low modulus, whereas the mechanical behavior of the reinforcing cord at high loads is mainly dictated by the reaction offered by the material having a high modulus.

The Applicant also believes that the helical geometry, by providing the reinforcing cords with the capability of extending longitudinally when subjected to a load, allows the metallic reinforcing cords used in the crossed belt structures to keep their design angle of inclination during the tyre shaping process.

Preferably, the diameter of the metallic wires is greater than, or equal to, 0.04 mm, more preferably greater than, or equal to, 0.08 mm, even more preferably greater than, or equal to, 0.10 mm.

Preferably, said diameter is less than, or equal to, 0.60 mm, more preferably less than, or equal to, 0.45 mm, even more preferably less than, or equal to, 0.40 mm.

In preferred embodiments, said diameter is comprised between 0.04 mm and 0.60 mm, preferably between 0.08 and 0.45 mm, even more preferably between 0.10 mm and 0.40 mm, for example equal to 0.14 mm or 0.22 mm.

Preferably, the number of said metallic wires is less than, or equal to, six, more preferably equal to two, three, four, five, or six.

Preferably, said metallic wires are twisted together with a twisting pitch greater than, or equal to, 2 mm, more preferably greater than, or equal to, 4 mm.

Preferably, said metallic wires are twisted together with a twisting pitch less than, or equal to, 50 mm, more preferably less than, or equal to, 25 mm.

In preferred embodiments, said metallic wires are twisted together with a twisting pitch comprised between 2 mm and 50 mm, preferably between 4 and 25 mm.

Preferably, the metallic reinforcing cord has a part load elongation greater than 1%, more preferably greater than 2%, even more preferably greater than 3%, even more preferably greater than 3.5%, even more preferably greater than 4%.

Preferably, the metallic reinforcing cord has an elongation at break greater than, or equal to, 4.5%, more preferably greater than, or equal to, 5%, even more preferably greater than, or equal to, 6%.

Depending on the intended particular application it is possible to select, among the various possible constructions of the metallic reinforcing cord, the one that is deemed most suitable. Once the construction of interest has been selected, the specific geometry of the metallic reinforcing cord of the invention can be selected by changing the twisting pitch of the metallic wires, and/or the diameter of the metallic wires, and/or the number of metallic wires and/or the minimum mutual distance between the metallic wires.

For example, by changing the twisting pitch of the metallic wires and/or their diameter and/or the minimum mutual distance between the metallic wires it is possible to increase the amount of elastomeric material incorporated between the metallic wires and more evenly distribute the metallic wires in the structural component.

Depending on the particular preselected construction and/or geometry, the reinforcing cord can be more suitable for being used in some structural components of the tyre than in other structural components of the tyre. For example, it is possible to provide for a construction and/or geometry adapted to maximize the rigidity, and/or the tensile strength and/or the penetration of the elastomeric material inside the space defined between the various metallic wires, or a different construction and/or geometry adapted to maximize the part load elongation and/or the elongation at break.

According to the Applicant, it is preferable to maximize the rigidity and/or the breaking load and/or the penetration when using the metallic reinforcing cord in the crossed belt structures of tyres for automobile wheels, or in the reinforcing structures of the bead, indicated below as "chafer" and "flipper", of tyres for automobile or motorcycle wheels, or in the carcass structures of tyres for motorcycle wheels, whereas it is preferable to maximize the part load elongation and/or the elongation at break when using the metallic reinforcing cord in the zero degrees belt layers of tyres for automobile and motorcycle wheels.

The Applicant believes that it can be advantageous to maximize the part load elongation also in the carcass structures of tyres, in order to increase the penetration of the elastomeric material inside the reinforcing cords.

The Applicant believes that, for example:
in order to maximize the rigidity and/or the breaking load it is possible to increase the number and/or the diameter of the metallic wires, while keeping the other parameters unchanged;
in order to maximize the penetration, it is possible to increase the twisting pitch of the metallic wires and/or the minimum mutual distance of the metallic wires, while keeping the other parameters unchanged;
in order to maximize the part load elongation and/or the elongation at break it is possible to reduce the twisting pitch of the metallic wires, while keeping the other parameters unchanged.

Preferably, in at least some cross sections of said at least one reinforcing layer, at least one of said metallic wires has a distance from one of said opposite interface surfaces less than or equal to the diameter of said metallic wires.

Such a provision is a consequence of the high spacing of the metallic wires at those cross sections of the metallic reinforcing cord in which such spacing is greater than or equal to the minimum mutual distance. However, it is preferred to still leave a layer of only elastomeric material on the opposite sides of the metallic wires so as to prevent the metallic wires from sticking out beyond the aforementioned opposite interface surfaces.

DESCRIPTION OF THE FIGURES

Further characteristics and advantages of the present invention will appear more clearly from the following detailed description of a preferred embodiment thereof, made with reference to the attached drawings.

In such drawings.

DETAILED DESCRIPTION OF EMBODIMENTS OF THE INVENTION

Figure 1:
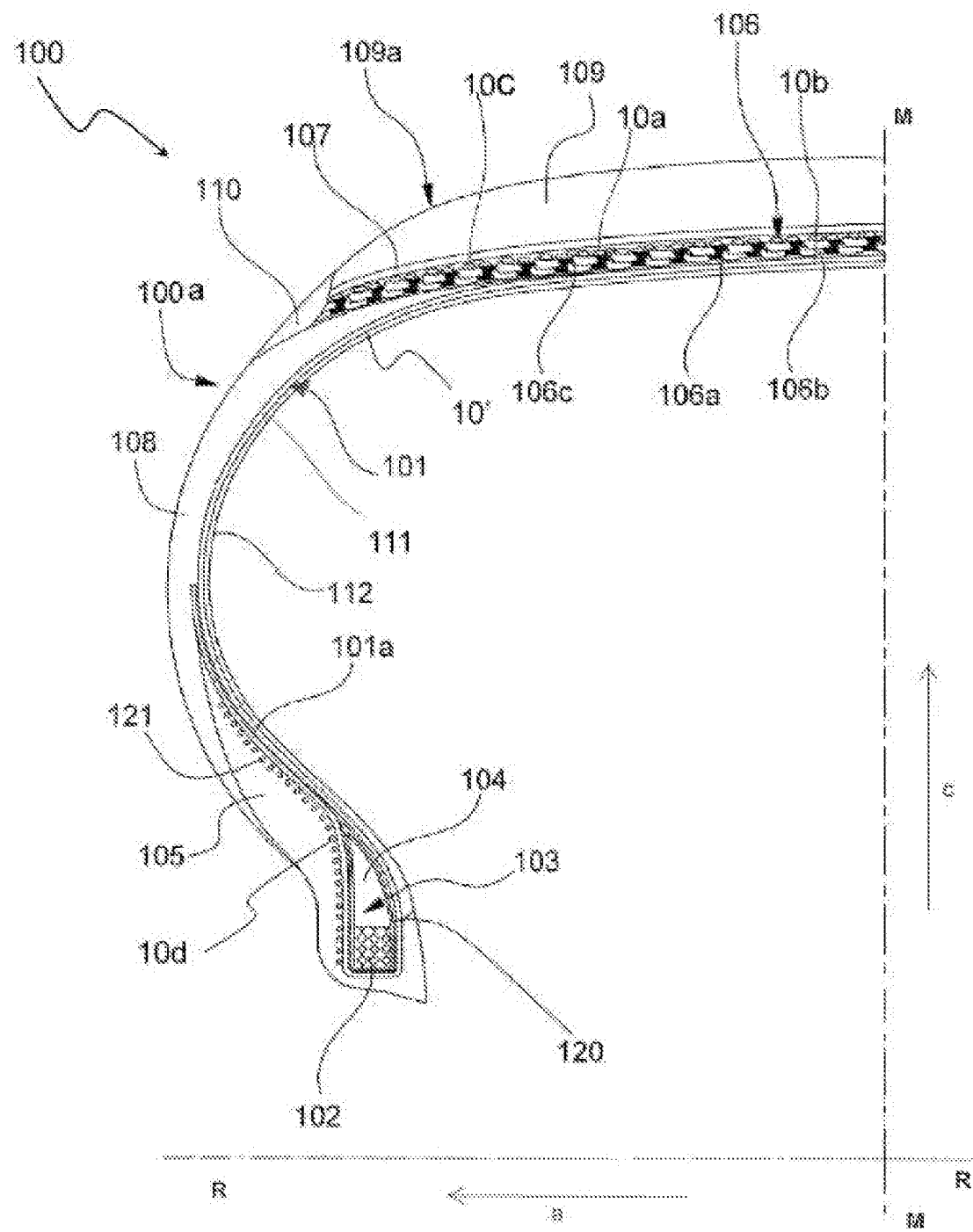
FIG. 1 is a schematic partial half-cross section view of a portion of an embodiment of a tyre in which a metallic reinforcing cord in accordance with the present invention can be used.

For the sake of simplicity, FIG. 1 shows only one side of an embodiment of a tyre 100 for vehicle wheels, the remaining side, which is not represented, being substantially identical and being arranged symmetrically with respect to the equatorial plane M-M of the tyre.

The tyre 100 illustrated in FIG. 1 is, in particular, a tyre for four-wheeled vehicles.

More in particular, the tyre 100 is an HP or UHP tyre for sports and/or high or ultra-high performance vehicles.

In FIG. 1 "a" indicates an axial direction, "c" indicates a radial direction, "M-M" indicates the equatorial plane of the tyre 100 and "R-R" indicates the rotation axis of the tyre 100.

The tyre 100 comprises at least one support structure 100a and, in a radially outer position with respect to the support structure 100a, a tread band 109 made of elastomeric material.

The support structure 100a comprises a carcass structure 101, which comprises at least one carcass layer 111.

Hereinafter, for the sake of simplicity of description, reference will be made to an embodiment of the tyre 100 comprising a single carcass layer 111, being nevertheless understood that what is described has analogous application in tyres comprising more than one carcass layer.

The carcass layer 111 has axially opposite end edges engaged with respective annular anchoring structures 102, called bead cores, possibly associated with an elastomeric filler 104. The zone of the tyre 100 comprising the bead core 102 and the possible elastomeric filler 104 forms an annular reinforcing structure 103 called "bead structure" and intended to allow the anchoring of the tyre 100 on a corresponding mounting rim, not shown.

The carcass layer 111 comprises a plurality of reinforcing cords 10' coated with an elastomeric material or incorporated in a matrix of cross-linked elastomeric material.

The carcass structure 101 is of the radial type, i.e. the reinforcing cords 10' are on planes comprising the rotation axis R-R of the tyre 100 and substantially perpendicular to the equatorial plane M-M of the tyre 100.

Each annular reinforcing structure 103 is associated with the carcass structure 101 by folding back (or turning) the opposite end edges of the at least one carcass layer 111 about the bead core 102 and the possible elastomeric filler 104, so as to form the so-called turnings 101a of the carcass structure 101.

In an embodiment, the coupling between carcass structure 101 and annular reinforcing structure 103 can be made through a second carcass layer (not shown in FIG. 1) which is applied in a radially outer position with respect to the carcass layer 111.

An anti-abrasion strip 105 is arranged at each annular reinforcing structure 103 so as to wrap around the annular reinforcing structure 103 along the axially inner, axially outer and radially inner zones of the annular reinforcing structure 103, thus being arranged between the latter and the rim of the wheel when the tyre 100 is mounted on the rim. However, embodiments wherein such an anti-abrasion strip 105 is not provided are foreseen.

The support structure 100a comprises, in a radially outer position with respect to the carcass structure 101, a crossed belt structure 106 comprising at least two belt layers 106a, 106b arranged in radial juxtaposition with respect to one another.

The belt layers 106a, 106b respectively comprise a plurality of reinforcing cords 10a, 10b. Such reinforcing cords 10a, 10b have an inclined orientation with respect to the circumferential direction of the tyre 100, or to the equatorial plane M-M of the tyre 100, by an angle comprised between 15° and 45°, preferably between 20° and 40°. For example, such an angle is equal to 30°.

The support structure 100a can also comprise a further belt layer (not shown) arranged between the carcass structure 101 and the radially inner belt layer of the aforementioned belt layers 106a, 106b and comprising a plurality of reinforcing cords having an inclined orientation with respect to the circumferential direction of the tyre 100, or to the equatorial plane M-M of the tyre 100, by an angle equal to 90°.

The support structure 100a can also comprise a further belt layer (not shown) arranged in a radially outer position with respect to the radially outer belt layer of the aforementioned belt layers 106a, 106b and comprising a plurality of reinforcing cords having an inclined orientation with respect to the circumferential direction of the tyre 100, or to the equatorial plane M-M of the tyre 100, by an angle comprised between 20° and 70°.

The reinforcing cords 10a, 10b of a belt layer 106a, 106b are parallel to one another and have a crossed orientation with respect to the reinforcing cords 10b, 10a of the other belt layer 106b, 106a.

In ultra-high-performance tyres, the belt structure 106 can be a turned crossed belt structure. Such a belt structure is made by arranging at least one belt layer on a support element and turning the opposite lateral end edges of said at least one belt layer. Preferably, a first belt layer is initially deposited on the support element, then the support element radially expands, then a second belt layer is deposited on the first belt layer and finally the opposite axial end edges of the first belt layer are turned on the second belt layer to at least partially cover the second belt layer, which is the radially outermost layer. In some cases, it is possible to deposit a third belt layer on the second belt layer. Advantageously, the turning of the axially opposite end edges of a belt layer on a radially outer belt layer imparts greater reactivity and responsiveness of the tyre when entering a bend.

The support structure 100a comprises, in a radially outer position with respect to the crossed belt structure 106, at least one zero degrees belt layer 106c, commonly known as "zero degrees belt". It comprises reinforcing cords 10c oriented along a substantially circumferential direction. Such reinforcing cords 10c thus form an angle of a few degrees (typically less than 10°, for example comprised between 0° and 6°) with respect to the equatorial plane M-M of the tyre 100.

The tread band 109 is applied in a radially outer position with respect to the zero degrees belt layer 106c.

Respective sidewalls 108 made of elastomeric material are also applied on the opposite lateral surfaces of the carcass structure 101, in an axially outer position with respect to the carcass structure 101 itself. Each sidewall 108 extends from one of the lateral edges of the tread band 109 up to the respective annular reinforcing structure 103.

The anti-abrasion strip 105, when provided, extends at least up to the respective sidewall 108.

In some specific embodiments, like the one shown and described herein, the rigidity of the sidewall 108 can be improved by providing a stiffening layer 120, generally known as "flipper" or additional strip-like insert, which has the function of increasing the rigidity and integrity of the annular reinforcing structure 103 and of the sidewall 108.

The flipper 120 is wound around a respective bead core 102 and the elastomeric filler 104 so as to at least partially surround the annular reinforcing structure 103. In particular, the flipper 120 wraps around the annular reinforcing structure 103 along the axially inner, axially outer and radially inner zones of the annular reinforcing structure 103.

The flipper 120 is arranged between the turned end edge of the carcass layer 111 and the respective annular reinforcing structure 103. Usually, the flipper 120 is in contact with the carcass layer 111 and the annular reinforcing structure 103.

In some specific embodiments, like the one shown and described herein, the bead structure 103 can also comprise a further stiffening layer 121 that is generally known with the term "chafer", or protective strip, and which has the function of increasing the rigidity and integrity of the annular reinforcing structure 103.

The chafer 121 is associated with a respective turned end edge of the carcass layer 111 in an axially outer position with respect to the respective annular reinforcing structure 103 and extends radially towards the sidewall 108 and the tread band 109.

The flipper 120 and the chafer 121 comprise reinforcing cords 10d (in the attached figures those of the chafer 121 cannot be seen) coated with an elastomeric material or incorporated in a matrix of cross-linked elastomeric material.

The tread band 109 has, in a radially outer position thereof, a rolling surface 109a intended to come into contact with the ground. The rolling surface 109a has circumferential grooves (not shown in FIG. 1) formed on it, which are connected by transversal notches (not shown in FIG. 1) so as to define a plurality of blocks of various shapes and sizes (not shown in FIG. 1) on the rolling surface 109a.

A sub-layer 107 can be arranged between the zero degrees belt layer 106c and the tread band 109.

In some specific embodiments, like the one shown and described herein, a strip 110 consisting of elastomeric material, commonly known as "mini-sidewall", can possibly be provided in the connection zone between the sidewalls 108 and the tread band 109. The mini-sidewall 110 is generally obtained through co-extrusion with the tread band 109 and allows an improvement of the mechanical interaction between the tread band 109 and the sidewalls 108.

Preferably, an end portion of the sidewall 108 directly covers the lateral edge of the tread band 109.

In the case of tyres without an air chamber, a layer of elastomeric material 112, generally known as "liner", can also be provided in a radially inner position with respect to the carcass layer 111 to provide the necessary impermeability to the inflation air of the tyre 100.

The carcass layer 111, the crossed belt layers 106a, 106b, the zero degrees belt layer 106, the flipper 120 and the chafer 121 define reinforcing layers of the tyre 100.

Figure 2:
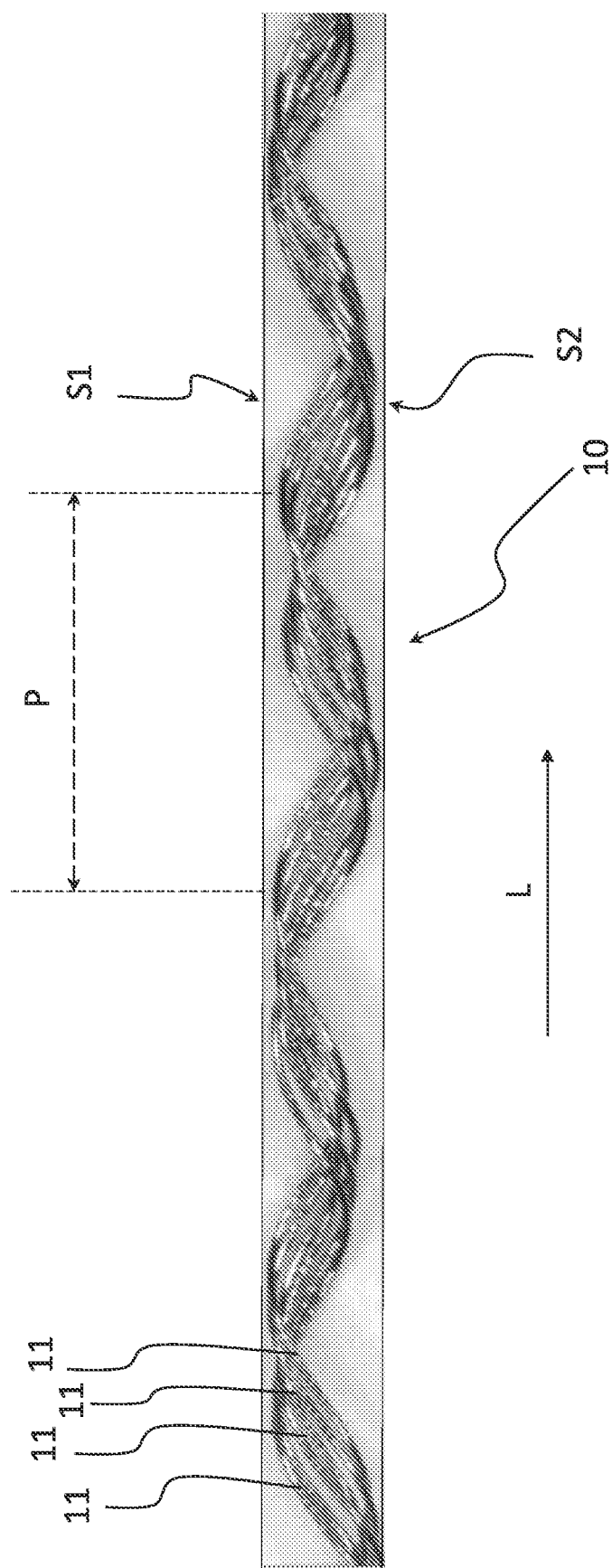
FIG. 2 is a photo of a segment of a first embodiment of a metallic reinforcing cord in accordance with the present invention.

As shown in FIG. 2, each of such reinforcing layers comprises opposite interface surface S1, S2 that delimit the reinforcing layer with respect to other structural and non-structural components of the tyre 100. The reinforcing cords of each of such reinforcing layers are arranged between the respective opposite interface surfaces.

Depending on the type of tyre 100, the reinforcing cords 10a, 10b, 10c, 10d can be metallic reinforcing cords 10 made in accordance with the present invention. Such metallic reinforcing cords 10 can also be used in the carcass or belt structure of tyres for motorcycle wheels.

An exemplary embodiment of a metallic reinforcing cord 10 in accordance with the present invention is illustrated in FIG. 2.

With reference to such a figure, the metallic reinforcing cord 10 comprises a plurality of metallic wires 11 (four in the illustrated example) each extending along a longitudinal direction L according to a helical geometry defined by a respective helix having a predetermined winding pitch P. The metallic reinforcing cord 10 thus extends longitudinally along a helical path with the aforementioned predetermined winding pitch P.

Figure 3:
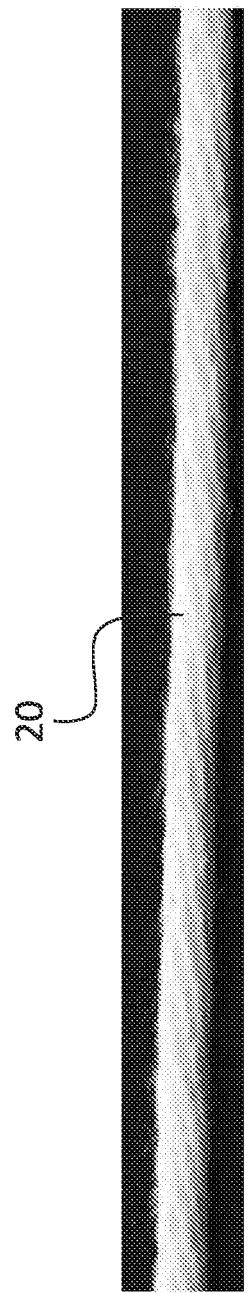
FIG. 3 is a photo of a textile yarn used to make the metallic reinforcing cord of FIG. 2.
Figure 3A:
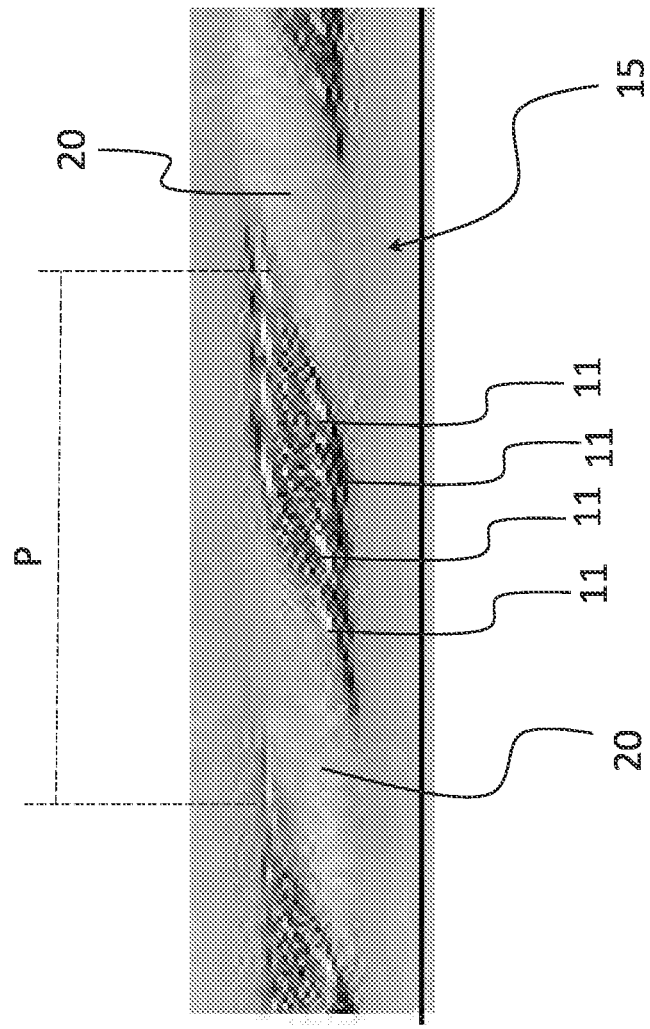
FIG. 3a is a photo of an elongated element used to make a metallic reinforcing cord in accordance with the present invention, such an elongated element comprising the textile yarn of FIG. 3.

With reference to FIGS. 3 and 3a, a metallic reinforcing cord in accordance with the present invention is obtained by twisting together, in a conventional twisting machine, a plurality of metallic wires 11 and a textile yarn 20 (for example of the type shown in FIG. 3) with a twisting pitch equal to the aforementioned winding pitch P, to form an elongated element 15 (for example of the type shown in FIG. 3a).

The elongated element 15 shown in FIG. 3a is obtained by twisting together four metallic wires 11 and the textile yarn 20 of FIG. 3. Such an elongated element 15 has a geometry such that, in some or all of the cross sections thereof, at least some of the metallic wires 11 are in a condition of substantial mutual contact (by this expression meaning both a condition of actual mutual contact of two adjacent steel wires and a condition in which the distance between two adjacent steel wires is much less than the diameter of the metallic wires, in particular equal to less than half the diameter of the steel wires, even more in particular less than one third of the diameter of the steel wires). Such an elongated element 15 has a space defined between the various metallic wires 11 that is occupied by the textile yarn 20 (which will then be removed). Such a space is much larger than the one which is present in a conventional metallic reinforcing cord of the same construction and increases, with all other parameters being the same, as the diameter of the textile yarn 20 increases (and thus as the number of filaments and/or ends of the textile yarn increases).

As will be described hereinafter with reference to FIGS. 4 and 5a, 5b, the textile yarn 20 is intended to be removed from the elongated element 15. After such removal the metallic wires 11 keep the same helical geometry that they had before the removal of the textile yarn 20, like for example the one shown in FIG. 3a. Alternatively, once the textile yarn 20 has been removed, at least some metallic wires 11 can be slightly spaced apart from one another. In this case, the elongated element 15 can, for example, take up the shape of the metallic reinforcing cord 10 shown in FIG. 2.

The metallic wires 11 are twisted together and with the textile yarn 20 so that, in at least some cross sections of the metallic reinforcing cord 10, at least some of them are spaced apart from one another by a minimum mutual distance equal to, or greater than, 2.5 times the diameter of the metallic wires 11. Such spacing can be achieved during the twisting of the metallic wires 11 with the textile yarn 20, for example working on the twisting pitch of the metallic wires 11, and/or on the diameter of the textile yarn 20, and/or on the degree of deformation (preforming or crimping) of the metallic wires 11, or after having removed the textile yarn 20, like in the case of the metallic reinforcing cord 10 shown in FIG. 3a. In this last case, the aforementioned spacing is obtained immediately after the removal of the textile yarn 20 having suitably selected the twisting pitch of the metallic wires 11, the number of metallic wires 11 and the diameter of the textile yarn 20 to be removed. Should in this way the desired spacing cannot be achieved after having removed the textile yarn 20, such spacing can be achieved by subjecting the metallic reinforcing cord 10 to suitable deformation (preforming or crimping) through cylinders having a predetermined diameter, as already described.

The aforementioned minimum mutual distance is a function of the diameter of the textile yarn 20 and, in particular, is at least equal to the diameter of the textile yarn 20.

The metallic wires 11 are preferably all made of the same material, more preferably all made of steel. The metallic wires 11 can be NT (Normal Tensile) steel wires or HT (High Tensile) steel wires or made ST (Super Tensile) steel wires or UT (Ultra Tensile) steel wires.

The metallic wires 11 have a carbon content less than or equal to 1, preferably less than or equal to 0.9%.

Preferably, the carbon content is greater than or equal to 0.7%. In preferred embodiments, the carbon content is comprised between 0.7% and 1%, preferably between 0.7% and 0.9%.

The metallic wires 11 are typically coated with brass or another corrosion-resistant coating (for example Zn/Mn).

The metallic wires 11 have a diameter preferably greater than, or equal to, 0.04 mm, more preferably greater than, or equal to, 0.08 mm, even more preferably less than, or equal to, 0.10 mm.

The metallic wires 11 have a diameter preferably less than, or equal to 0.60 mm, more preferably less than, or equal to, 0.45 mm.

In preferred embodiments, the metallic wires 11 have a diameter comprised between 0.04 mm and 0.60 mm, preferably between 0.08 mm and 0.45 mm, even more preferably between 0.10 mm and 0.45 mm.

Preferably, the metallic wires 11 all have the same diameter, but there are embodiments in which the metallic wires 11 have different diameters.

The number of metallic wires 11 is comprised between two and ten, preferably between two and six, more preferably between two and five.

The textile yarn 20 is preferably made of a water-soluble synthetic polymeric material, even more preferably a polyvinyl alcohol (PVA). Such a textile yarn 20 can be purchased from specialized producers, like for example Kuraray Co., Ltd or Sekisui Specialty Chemicals, or be made by twisting together a plurality of PVA filaments in a conventional twisting machine.

The textile yarn 20 has a diameter preferably greater than, or equal to, 0.15 mm, more preferably greater than, or equal to, 0.30 mm. The textile yarn 20 has a diameter preferably lower than, or equal to, 2 mm, more preferably lower than, or equal to, 1 mm.

In preferred embodiments, the textile yarn 20 has a diameter comprised between 0.15 mm and 2 mm, preferably between 0.30 mm and 5 mm, more preferably between 0.50 mm and 1 mm.

The textile yarn 20 has a linear density preferably greater than, or equal to, 200 dtex, more preferably greater than, or equal to, 700 dtex.

The textile yarn 20 has a linear density preferably lower than, or equal to, 4400 dtex, more preferably lower than, or equal to, 1670 dtex. In preferred embodiments, the textile yarn 20 has a linear density comprised between 200 dtex and 4400 dtex, preferably between 700 dtex and 1670 dtex.

The elongated element 15 can comprise more than one textile yarn 20.

Each metallic wire 11 can be twisted on itself, in the same direction as, or in the opposite direction to, the direction in which it is twisted on the textile yarn 20.

The twisting pitch P of the metallic wires 11 is preferably greater than, or equal to, 2 mm, more preferably greater than, or equal to, 3 mm, even more preferably greater than, or equal to, 4 mm, even more preferably greater than, or equal to, 5 mm.

The twisting pitch P of the metallic wires 11 is preferably lower than, or equal to, 50 mm, more preferably lower than, or equal to, 25 mm.

In preferred embodiments, the twisting pitch P of the metallic wires 11 is comprised between 2 mm and 50 mm, preferably between 4 mm and 25 mm.

The arrangement of the metallic wires 11 about the textile yarn 20 is such that the metallic wires 11 do not completely wrap around the textile yarn 20. In particular, the metallic wires 11 are arranged around the textile yarn 20 so that, in any cross section of the elongated element 15, they are at only an angular portion of an ideal circumference that circumscribes the textile yarn 20. Such an angular portion is defined by an angle that is preferably greater than, or equal to, 15°, more preferably greater than, or equal to, 20°.

Preferably, such an angle is lower than, or equal to, 45°, more preferably lower than, or equal to, 30°.

In preferred embodiments such an angle is comprised between 15° and 45°, more preferably between 20° and 30°.

The greater the twisting pitch P the greater the aforementioned angle.

The metallic reinforcing cord 10 can be obtained from a plurality of elongated elements 15 twisted together.

The metallic wires 11 are twisted together with the textile yarn 20 with the aforementioned twisting pitch P to form metallic reinforcing cords having a construction of the n×D type, where n is the number of metallic wires 11 and D is the diameter of the metallic wires 11.

Examples of metallic reinforcing cords 10 having a construction of the n×D type are shown in FIGS. 2, 3a, 8-13.

The metallic reinforcing cord 10 of FIG. 2 and the one of FIG. 3a has a 4×D construction, whereas the construction of the reinforcing cords of FIGS. 8-13 is indicated in the aforementioned figures.

As shown in FIG. 2, at least some of the metallic wires 11 of the reinforcing cord 10 have a distance from at least one of the interface surfaces S1 and S2 of the respective structural component less than or equal to the diameter of said metallic wires 11.

Figure 4:
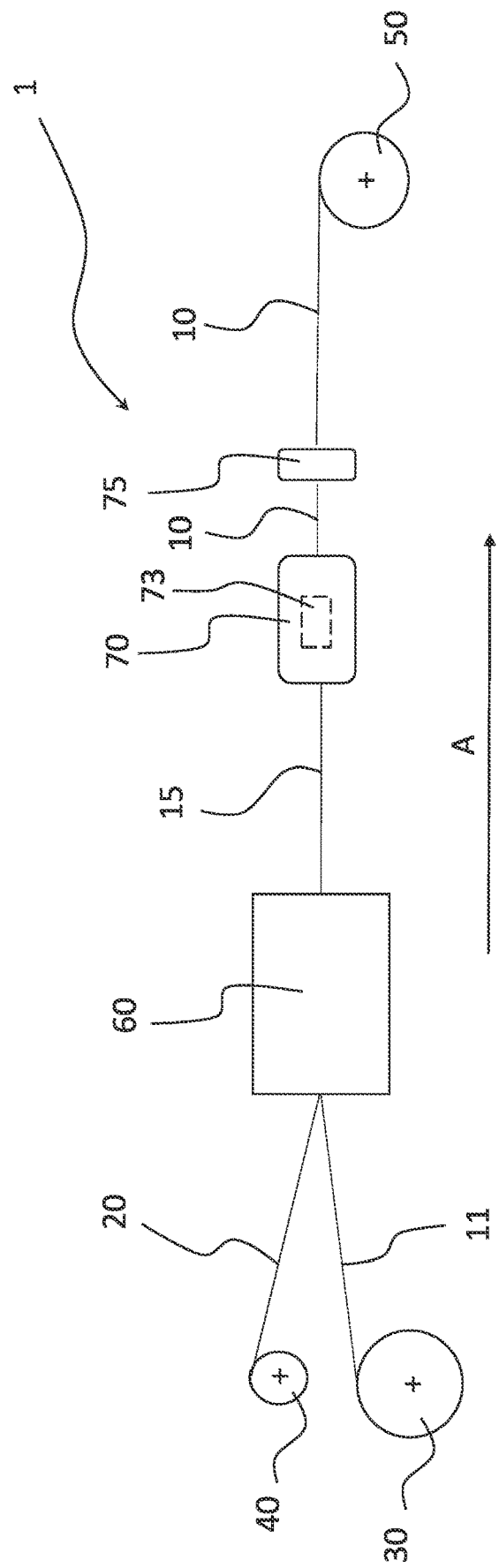
FIG. 4 is a schematic view of a first embodiment of an apparatus for making the metallic reinforcing cord in accordance with the present invention, such an apparatus carrying out a continuous process.

With reference to FIG. 4, an embodiment of an apparatus and of a process for manufacturing the metallic reinforcing cord 10 in accordance with the present invention are described. For the sake of simplicity of description, reference will be made to a metallic reinforcing cord 10 obtained from a single elongated element 15, the latter being obtained by twisting together two metallic wires 11 and a single textile yarn 20. For the sake of simplicity of illustration in FIG. 4 only one of the two metallic wires 11 is shown.

The textile yarn 20 and the metallic wires 11 are taken from respective reels 40 and 30 (the other reel 30 from which the other metallic wire 11 is taken is not visible) and fed to a twisting device 60 to be twisted together, so as to form the elongated element 15. The twisting device 60 is therefore arranged downstream of the reels 40 and 30 with respect to a feeding direction indicated with A in FIG. 4.

The elongated element 15 is fed, along said feeding direction A, to a removal device 70 in which the textile yarn 20 is removed from the elongated element 15, thus obtaining the metallic reinforcing cord 10. The removal device 70 is therefore arranged downstream of the twisting device 60 with respect to the feeding direction A.

In a preferred embodiment of the invention, the removal device 70 comprises a hot water jet feeding device 73 configured to feed a hot water jet against the elongated element 15, in a counter-current while the elongated element 15 moves along the feeding direction A. The hot water jet dissolves the textile yarn 20 while such a jet is crossed by the metallic wires 11, which remain the only constituent elements of the metallic reinforcing cord 10.

Preferably, the metallic reinforcing cord 10 thus formed then crosses a drying device 75 to be subsequently wound in a respective collection reel 50, from which it can be taken during the manufacture of the specific structural component of the tyre 100 of interest. The drying device 75 is therefore arranged downstream of the removal device 70 with respect to the feeding direction A.

In the process described above with reference to FIG. 4, the manufacturing of the metallic reinforcing cord 10 is carried out while obtaining the elongated element 15 (and while removing the textile yarn 20). The metallic reinforcing cord 10 is thus made through a continuous process that comprises, in a time sequence free of interruptions or stops, making the elongated element 15 by mutually twisting the metallic wires 11 and the textile yarn 20, moving the elongated element 15 thus made along the feeding direction A, removing the textile yarn 20, possibly drying the metallic reinforcing cord 10 thus formed and winding the metallic reinforcing cord 10 in the collection reel 50.

Figures 5A, 5B:
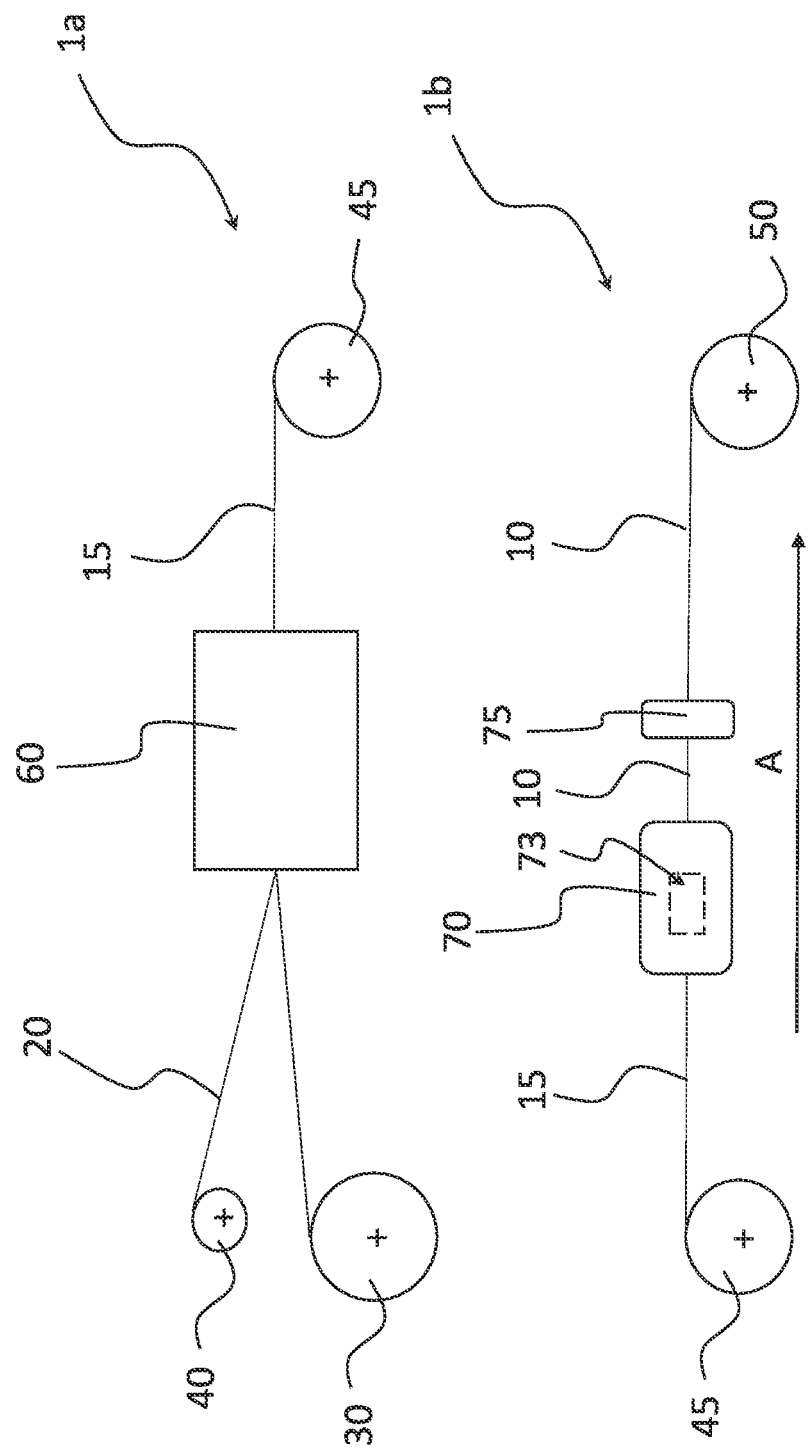
FIGS. 5a and 5b illustrate a second embodiment of an apparatus for making the metallic reinforcing cord in accordance with the present invention, such an apparatus carrying out a discontinuous process.

However, it is possible to manufacture the metallic reinforcing cord 10 in two distinct operative steps, i.e. through a discontinuous process like for example the one shown in FIGS. 5a, 5b. Such a process differs from the one described above with reference to FIG. 4 only in that the elongated element 15, once made, is collected in a service reel 45 (FIG. 5a), from which it can be taken when desired to proceed with the manufacturing of the metallic reinforcing cord 10 as described earlier (FIG. 5b). The service reel 45 is thus intended to be arranged downstream of the twisting device 60 when the elongated element 15 is made and upstream of the removal device 70 when the textile yarn 20 is removed from the elongated element 15 to manufacture the metallic reinforcing cord 10.

The metallic reinforcing cords 10 are intended to be incorporated in a piece of elastomeric material through conventional calendering processes in conventional rubberizing machines, thus making the various structural components of the tyre 100 described above.

The metallic reinforcing cord 10 can be made with different helical geometries depending on the particular application (type of tyre of interest or structural component thereof of interest). The helical geometry can be changed by intervening on one or more of the following parameters: number of metallic wires 11, diameter of the metallic wires 11, diameter (or linear density) of the textile yarn 20 (depending on the number of filaments and/or ends of the textile yarn 20), twisting pitch P, number of textile yarns 20, degree of preforming in the twisting device 60 or in the rubberizing machine.

Depending on the predetermined helical geometry the metallic reinforcing cord 10 will have different mechanical behavior that translates, in a load-elongation graph, into a different curve. It is thus possible to manufacture metallic reinforcing cords 10 having different rigidities, breaking loads, elongations at break, penetrations and part load elongations.

Figure 6:
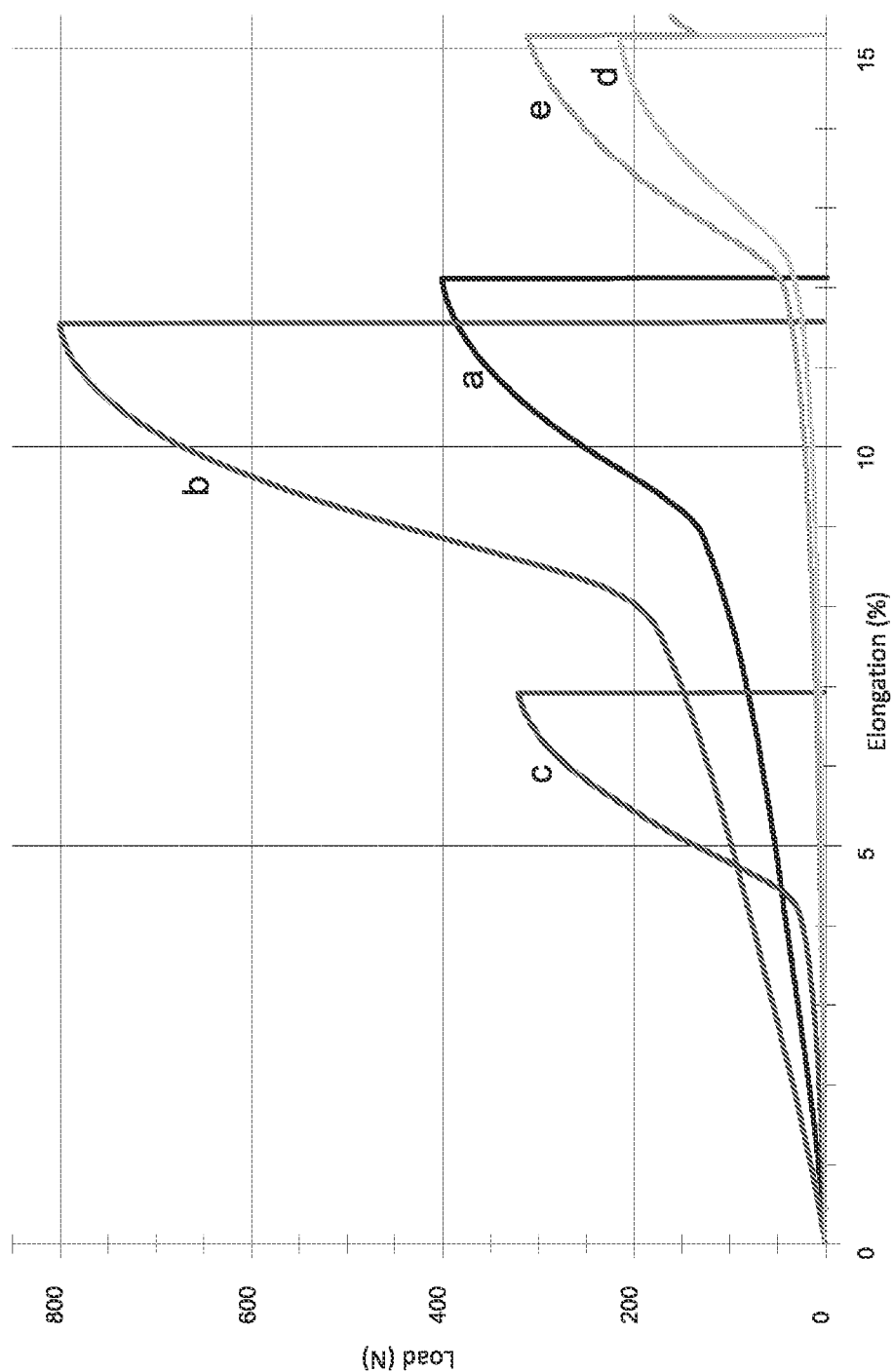
FIGS. 6 and 7 show some load-elongation graphs of metallic reinforcing cords made in accordance with the present invention.

FIG. 6 shows, as an example, the load-elongation curves of five metallic reinforcing cords 10 made in accordance with the present invention and having different helical geometry:

the reinforcing cord of the curve indicated with a has a construction 32+2×0.30 HT;

the reinforcing cord of the curve indicated with b has a construction 32+4×0.30 HT;

the reinforcing cord of the curve indicated with c has a construction 16+6×0.14 HT;

the reinforcing cord of the curve indicated with d has a construction 32+4×0.14 HT;

the reinforcing cord of the curve indicated with e has a construction 32+6×0.14 HT.

In the aforementioned constructions the number before the symbol+ indicates the number of filaments or ends twisted together to obtain the textile yarn 20 that will then be removed (such a number is thus indicative of the diameter of the textile yarn 20), the number after + indicates the number of metallic wires 11 twisted together with the textile yarn 20, the number after x indicates the diameter of the metallic wires 11 (in mm) and HT indicates the type of steel used.

FIG. 6 shows that it is possible to manufacture metallic reinforcing cords 10 having part load elongations even equal to 12% and elongations at break even equal to 15%. These values are much greater than those obtainable with conventional metallic reinforcing cords; the latter, indeed, typically have values of part load elongation not greater than 3% and values of elongation at break not greater than 5%, in the case of HE metallic reinforcing cords. It should also be noted that, for example, by increasing the number of ends in the textile yarn 20 (and therefore the diameter of the textile yarn 20) while keeping the other parameters unchanged, the part load elongation and the elongation at break increase, thus keeping the rigidity and the breaking load unchanged (comparison between curves c and e), whereas by decreasing the diameter of the metallic wires while keeping the other parameters unchanged, the part load elongation and the elongation at break increase, thus reducing the rigidity and the breaking load (comparison between curves b and d).

Figure 7:
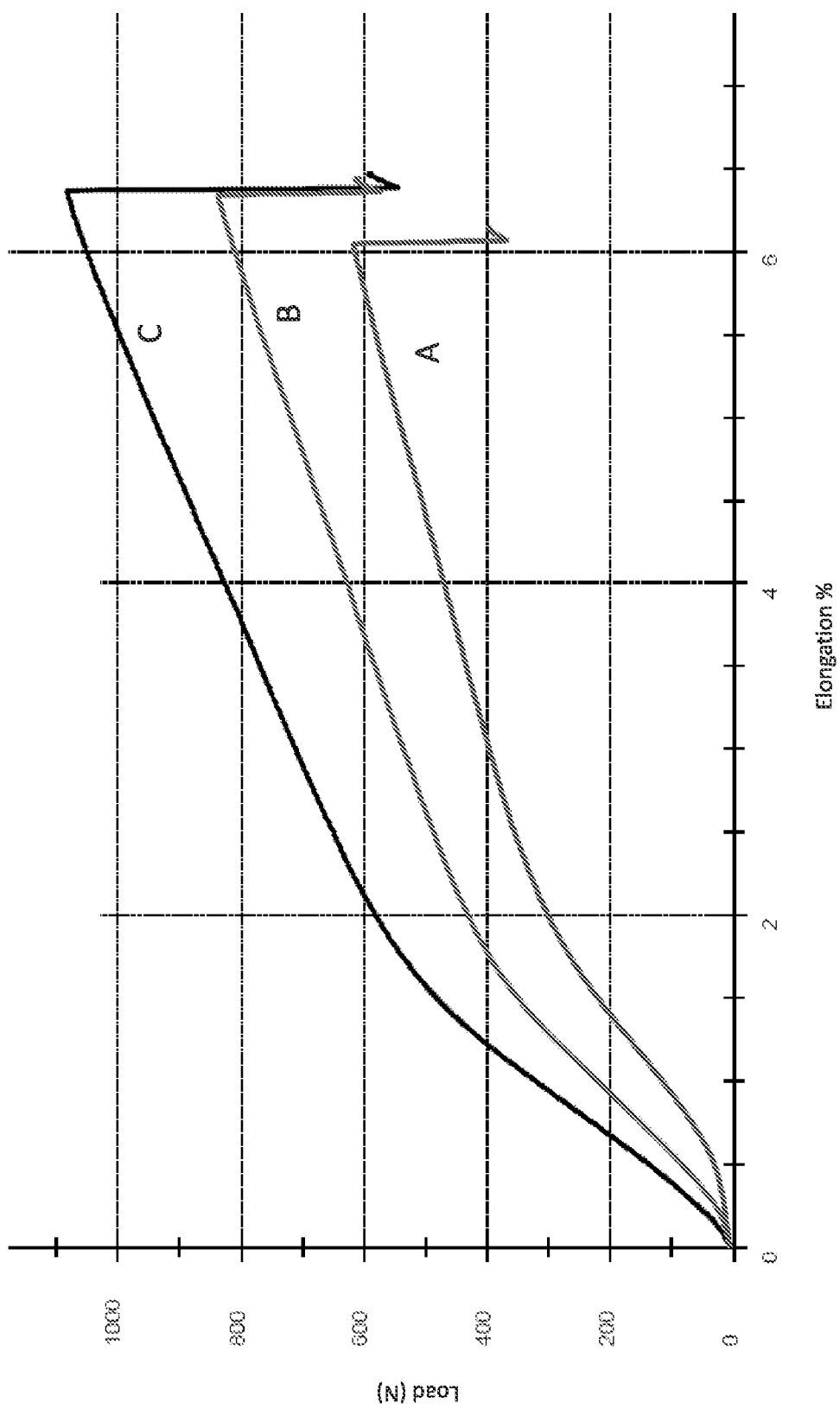

FIG. 7 shows, as an example, the load-elongation curves of further three metallic reinforcing cords having different helical geometries (curves A, B and C). The reinforcing cord of the curve indicated with A is a HE metallic reinforcing cord made by twisting together three metallic steel wires having a diameter equal to 0.35 mm and a textile yarn having 36 ends twisted together and subjected to conventional preforming systems, in particular of the permanent wave type. Such a cord thus has a construction 36+3×0.35 HE. The reinforcing cord of the curve indicated with B is a HE metallic reinforcing cord having a construction 36+4×0.35 HE; it differs from the one discussed above only in that it comprises four metallic wires. The reinforcing cord of the curve indicated with C is a HE metallic reinforcing cord having a construction 36+5×0.35 HE; it differs from those discussed above only in that it comprises five metallic wires.

The graphs discussed above therefore confirm what has already been stated earlier, i.e. that by changing one or more among number of metallic wires 11, diameter of the metallic wires 11, diameter (or linear density) of the textile yarn 20 (i.e. number of filaments or ends of the textile yarn 20), twisting pitch P, number of textile yarns 20, it is possible to manufacture metallic reinforcing cords 10 having different helical geometries (or constructions), thus being able each time to manufacture a metallic reinforcing cord 10 having the mechanical behavior deemed most suitable for the tyre of interest or for the structural component of interest.

In accordance with the present invention, whatever the helical geometry of the metallic reinforcing cord 10 it is possible to ensure that in some of the cross sections of the cord some metallic wires 11 are in a condition of substantial mutual contact, or that there are first cross sections of the metallic reinforcing cord 10 in which some or all of the metallic wires are in a condition of substantial mutual contact and second cross sections of the metallic reinforcing cord 10 in which some or all of the metallic wires 11 are spaced apart from one another.

It is also possible to manufacture metallic reinforcing cords 10 having helical geometries such that in all of the cross sections of the metallic reinforcing cord 10 all of the metallic wires are spaced apart from one another.

Such spacing can be obtained by suitably deforming (or preforming) the metallic reinforcing cords 10 while they are pulled with a predetermined traction force, which can be constant or variable over time. Such a deformation (or preforming) can be obtained by making the metallic reinforcing cord 10 pass over a plurality of cylinders having a small diameter (for example comprised between 1 and 5 mm) with a predetermined pull. Such deformation is the minimum when cylinders of larger diameter are used and the maximum when cylinders of smaller diameter are used.

In accordance with the present invention, thanks to the use of the textile yarn 20 while the metallic reinforcing cord 10 is being made, and in particular during twisting together the metallic wires 11, it is possible to ensure that in at least some cross sections of the metallic reinforcing cord 10 at least some of the metallic wires 11 are arranged to a minimum mutual distance equal to, or greater than, 2.5 times the diameter of the metallic wires 11.

FIGS. 8-13 illustrate, as an example, various metallic reinforcing cords 10 made in accordance with the present invention and respective conventional metallic reinforcing cords, indicated with STD. All of the illustrated reinforcing cords have a helical geometry, but such helical geometry is different depending on the specific construction of each of the illustrated reinforcing cords.

Figure 8:
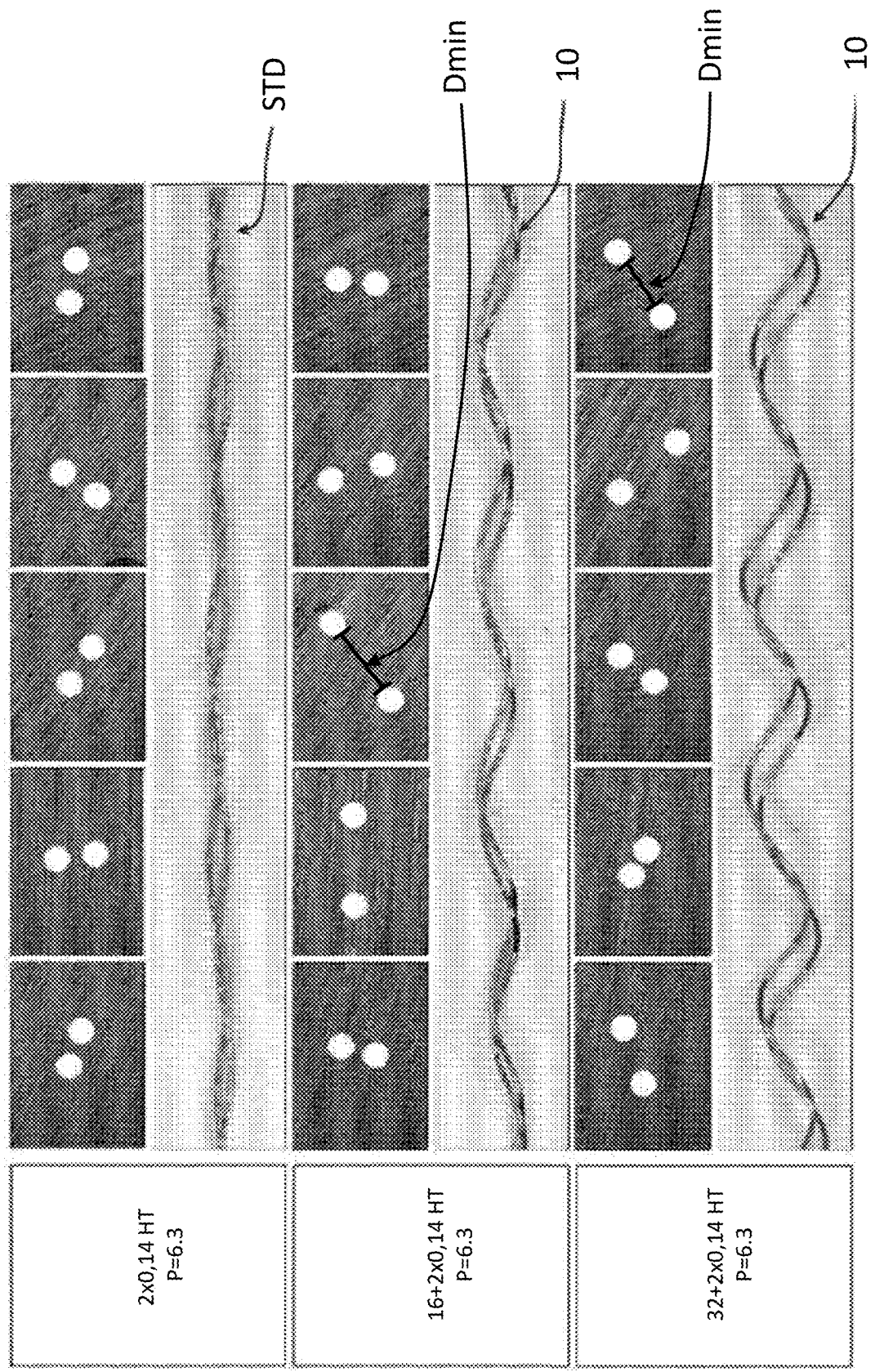
FIGS. 8-13 show various examples of metallic reinforcing cords made in accordance with the present invention and of conventional metallic reinforcing cords; some cross sections of each of the aforementioned reinforcing cords in a respective structural component of the tyre are also illustrated.
Figure 9:
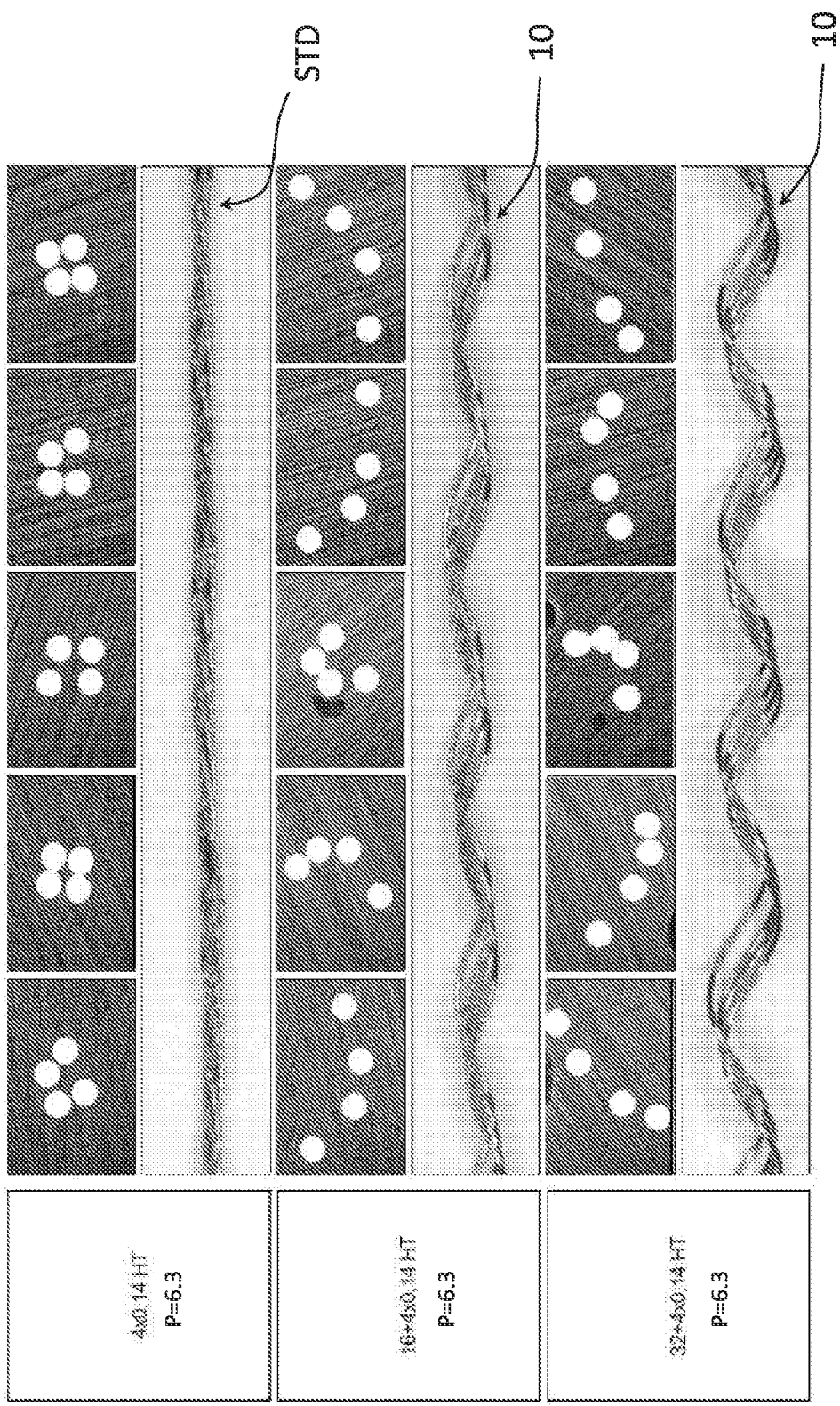
Figure 10:
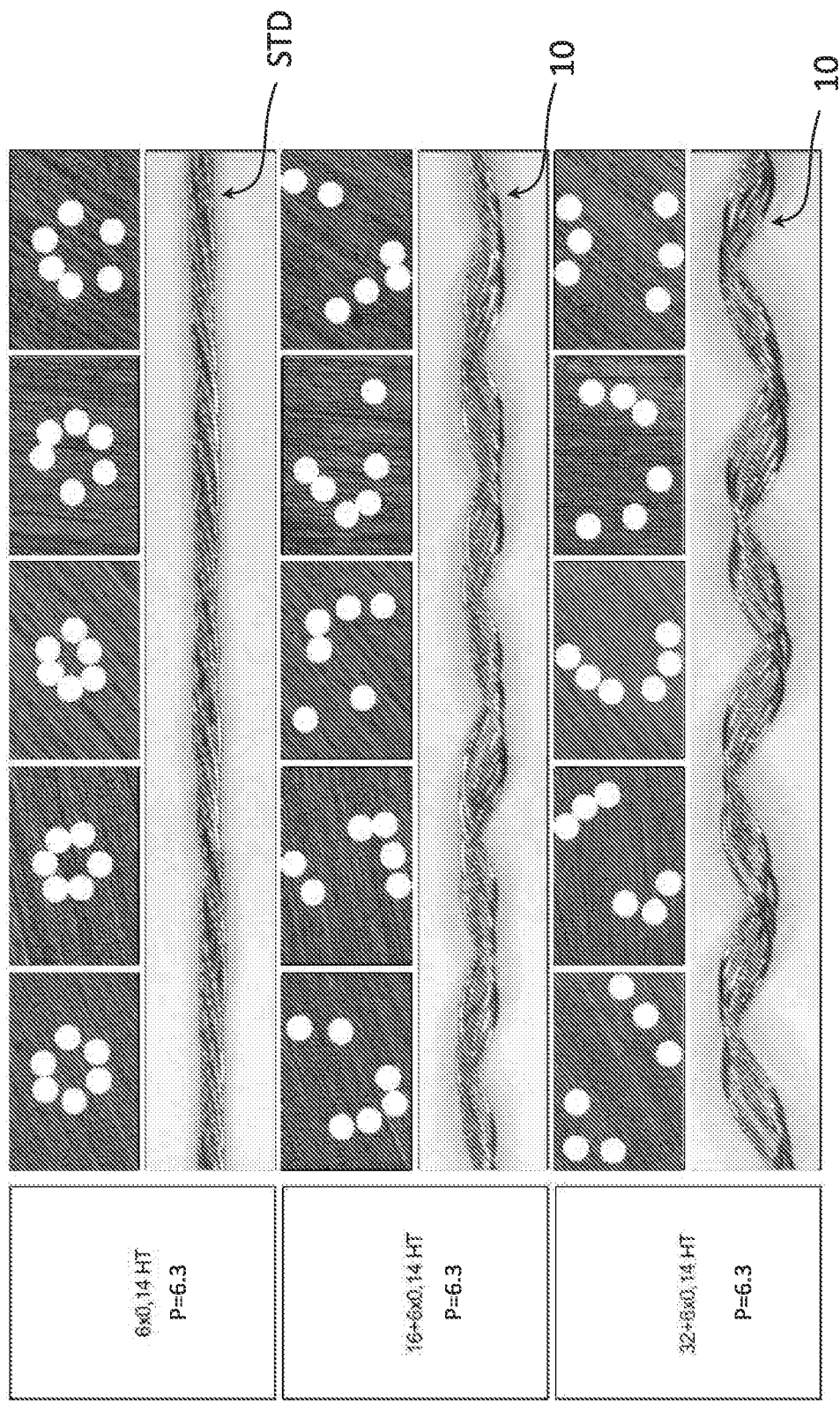

In FIGS. 8-10, above each of the illustrated reinforcing cords various cross sections of the reinforcing cord are shown and, on the left, the specific construction of the metallic reinforcing cord 10 is shown. P indicates the twisting pitch in mm and before the symbol+ the number of filaments or ends of the textile yarn 20 used to make the illustrated metallic reinforcing cords 10 is indicated.

Figure 11:
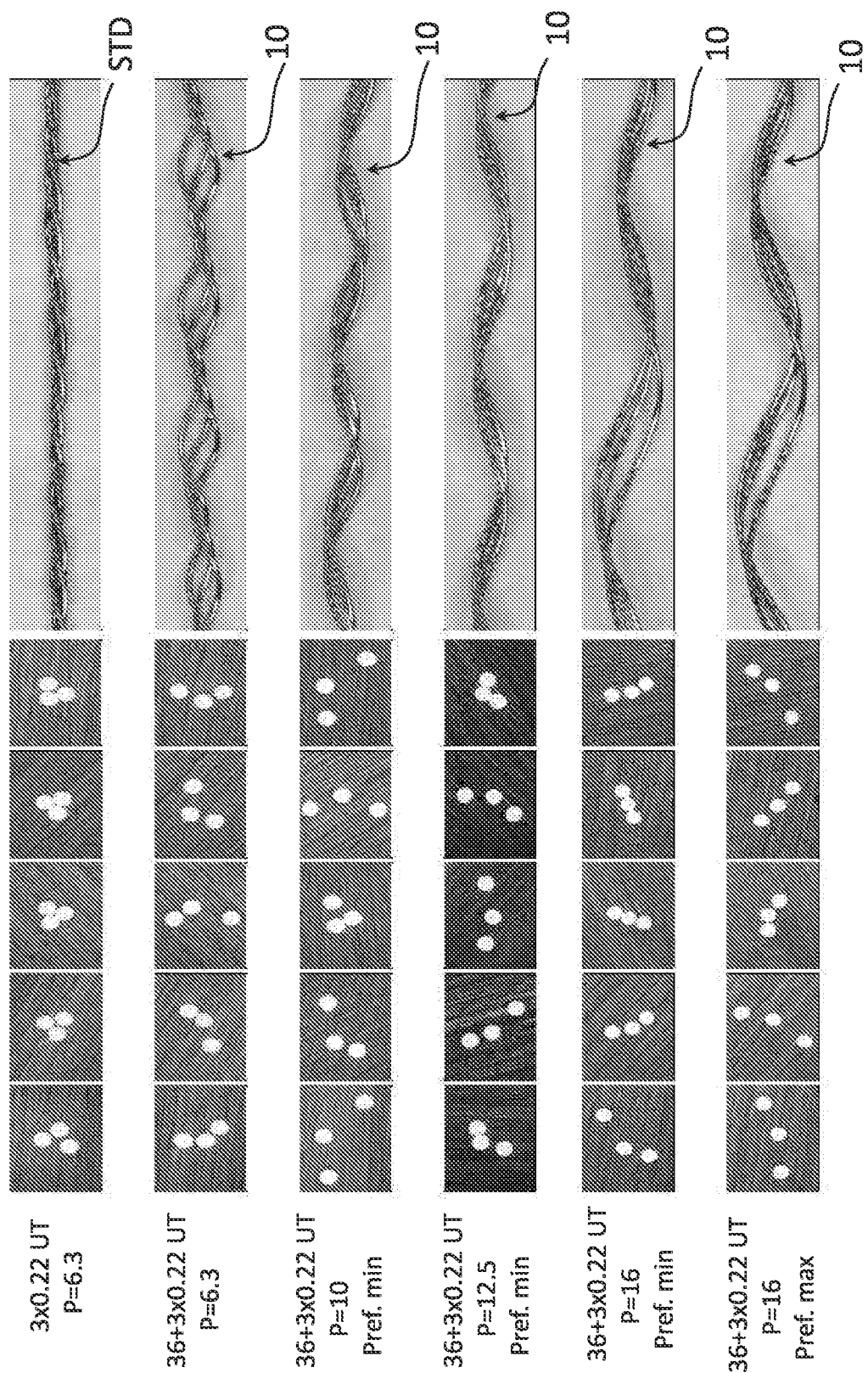
Figure 12:
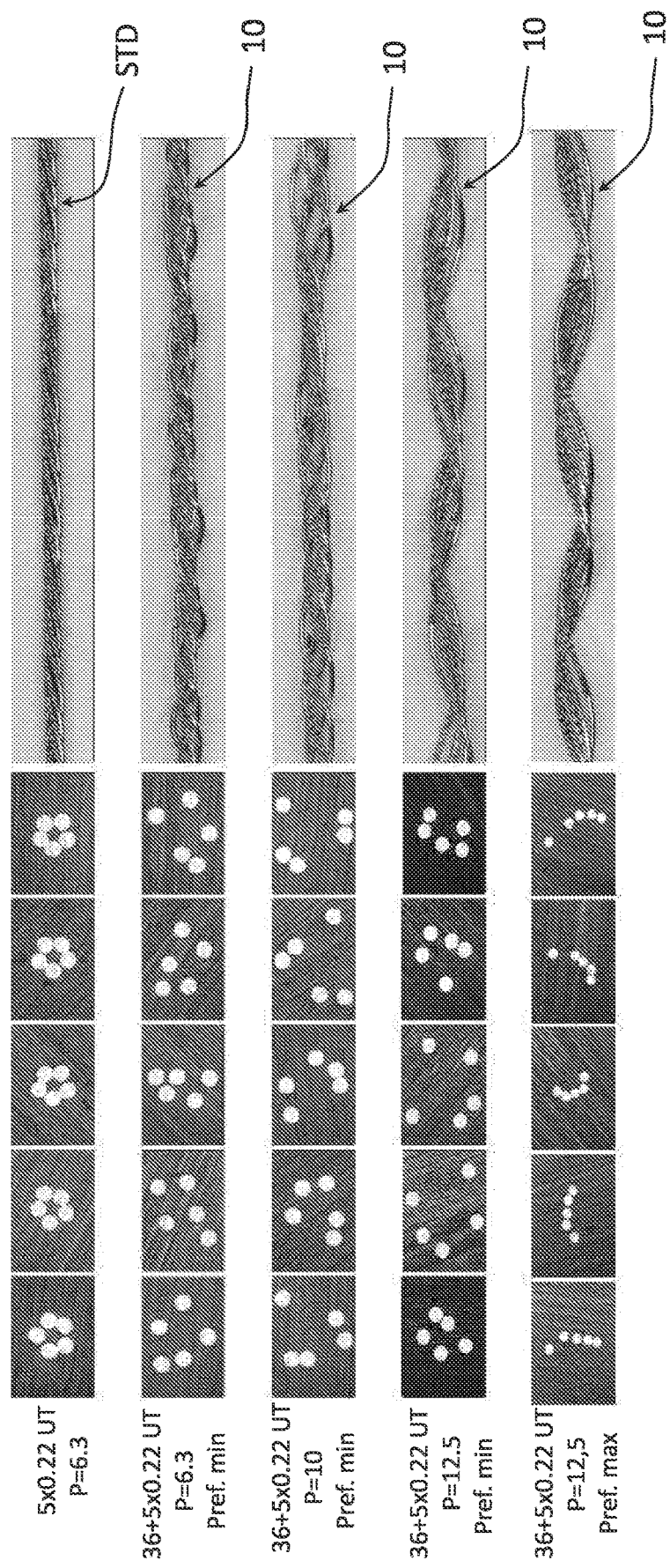
Figure 13:
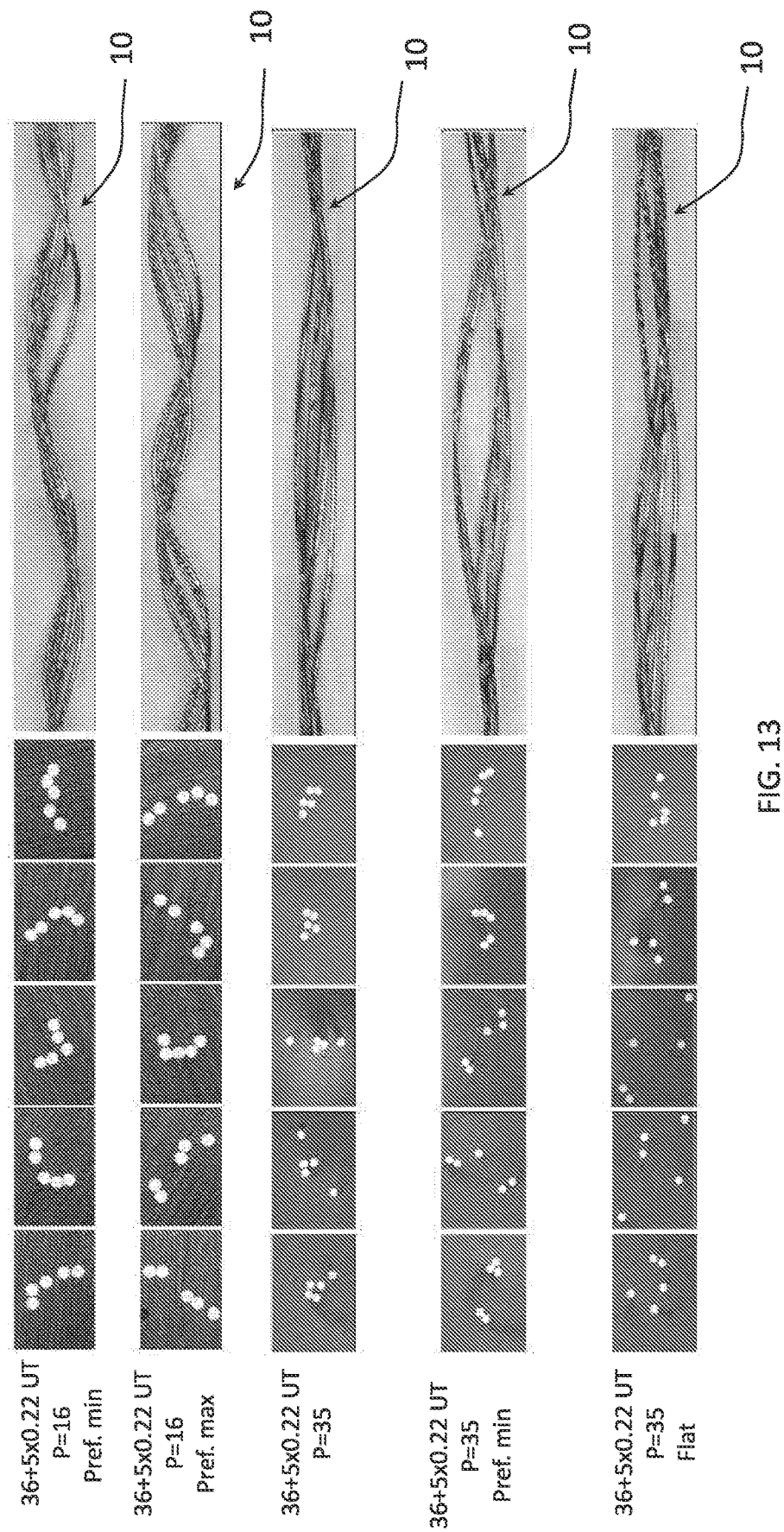

In FIGS. 11-13, to the left of each of the illustrated reinforcing cords various cross sections of the reinforcing cord are shown and, to the left of such cross sections, the specific construction of the metallic reinforcing cord 10 is shown. Also in these figures, P indicates the twisting pitch in mm and before the symbol+ the number of filaments or ends of the textile yarn 20 used to make the illustrated metallic reinforcing cords 10 is indicated.

FIG. 8 shows a conventional metallic reinforcing cord (indicated with STD) and two metallic reinforcing cords 10 made in accordance with the present invention.

The reinforcing cords shown in FIG. 8 comprise two HT steel wires having a diameter equal to 0.14 mm. In at least some cross sections of the two metallic reinforcing cords 10, the distance between the two steel wires (corresponding to the space defined between the various steel wires and originally occupied by the textile yarn used to make them) is much greater than that of the conventional metallic reinforcing cord. Consequently, the metallic wires 11 of the two metallic reinforcing cords 10 have a distribution in the structural component greater than that of the metallic wires of the conventional reinforcing cord. With respect to the latter, in the two metallic reinforcing cords 10 the penetration of the elastomeric material between the metallic wires (and therefore also the adhesion of the elastomeric material to the metallic wires), the elongation at break and the part load elongation increases.

FIGS. 9 and 10 respectively show a conventional metallic reinforcing cord (indicated with STD) and two metallic reinforcing cords 10 made in accordance with the present invention. The reinforcing cords shown in FIG. 9 comprise four HT steel wires having a diameter equal to 0.14 mm, whereas the reinforcing cords shown in FIG. 10 comprise six steel wires HT having a diameter equal to 0.14 mm. Both for the reinforcing cords 10 of FIG. 9 and for those of FIG. 10 the same considerations made above with reference to FIG. 8 apply.

Moreover, in FIGS. 9 and 10 it can be seen that, keeping all other parameters the same, as the diameter (or number of filaments or ends) of the textile yarn used to make the metallic reinforcing cords 10 increases, the helical geometry of the metallic reinforcing cord 10 and the distribution of the metallic wires in the structural component changes. In particular, unlike the conventional metallic reinforcing cord in which the metallic wires are grouped together and concentrated substantially at the center of the aforementioned structural component, in the metallic reinforcing cords 10 the metallic wires are more distributed over the entire volume of the structural component, up to be arranged close to the opposite interface surfaces of the structural component, at a distance less than the diameter of the metallic wires.

FIG. 11 shows a conventional metallic reinforcing cord (indicated with STD) and five metallic reinforcing cords 10 made in accordance with the present invention, four of which are subjected to a suitable deformation so as to try to space all of the metallic wires from one another. The term "pref." indicates the degree of deformation (minimum or maximum) to which the metallic reinforcing cord 10 has been subjected in order to achieve a mutual spacing of all of the metallic wires.

All of the reinforcing cords shown in FIG. 11 comprise three UT steel wires having a diameter equal to 0.22 mm.

It should be noted that, keeping all other parameters the same, as the twisting pitch P increases the helical geometry of the metallic reinforcing cord 10 and the distribution of the metallic wires in the structural component of the tyre change. The same considerations made above with reference to FIGS. 8-10 apply.

It should also be noted that, keeping all other parameters the same, the greater the deformation the greater the distribution of the metallic wires in the structural component (comparison between the last two reinforcing cords at the bottom in FIG. 11). The degree of deformation imparted to the metallic reinforcing cord 10 can thus also be considered as an useful parameter on which to intervene in order to provide the metallic reinforcing cord 10 with the helical geometry deemed ideal for the particular application required.

FIGS. 12 and 13 show a conventional metallic reinforcing cord (indicated with STD in FIG. 12) and nine metallic reinforcing cords 10 made in accordance with the present invention. Some of the illustrated metallic reinforcing cords 10 have been subjected to a suitable deformation so as to try to space all of the metallic wires from one another. Also in this case, the term "pref." indicates the degree of deformation (minimum or maximum) to which the metallic reinforcing cord 10 has been subjected in order to achieve a mutual spacing of all of the metallic wires.

All of the reinforcing cords shown in FIGS. 12 and 13 comprise five UT steel wires having a diameter equal to 0.22 mm. The same considerations made above with reference to FIGS. 8-11 apply.

It should be noted that, keeping all other parameters the same, as the twisting pitch P increases the helical geometry of the metallic reinforcing cord 10 and the distribution of the metallic wires in the structural component of the tyre change.

It should also be noted that it is possible to provide for very large twisting pitches (up to 35 mm) without the risk of having unravelling and that it is also possible to make very flat metallic reinforcing cords 10, even if with metallic wires widely spaced apart from one another (see in particular the last metallic reinforcing cord 10 shown in FIG. 13, indicated with FLAT). This for example makes it possible to double, or more generally multiply, the number of metallic reinforcing cords provided in a specific portion of structural component with respect to the case in which conventional metallic reinforcing cords are used.

All of the examples discussed above and shown in the attached figures demonstrate how wide is the possibility of making metallic reinforcing cords 10 according to the invention having different mechanical behaviors, through the process and/or the apparatus described above, each time making it possible to identify the ideal one for the particular application required. In particular, applications are foreseen in the crossed belt structure and/or in the chafer and/or in the flipper and/or in the zero degrees belt layer of tyres for automobiles and in the zero degrees belt layer and/or in the chafer and/or in the flipper of tyres for motorcycles.

The Applicant has carried out comparative tests to evaluate the mechanical behavior of metallic reinforcing cords made in accordance with the present invention.

In a first series of tests, the Applicant has evaluated the behavior under fatigue of a piece of elastomeric material comprising conventional metallic reinforcing cords (hereinafter indicated with "piece STD") and compared it with that of a piece of elastomeric material comprising metallic reinforcing cords in accordance with the present invention (hereinafter indicated with "piece INV").

The behavior under fatigue of the pieces STD and INV was evaluated by subjecting such pieces to repeated dynamic compression cycles, thereby simulating the stresses to which the belt structure of a tyre is typically subjected.

Both the piece STD and the piece INV were made by juxtaposing two respective reinforcing layers, each comprising respective metallic reinforcing cords. The two layers were juxtaposed and oriented so as to simulate a crossed belt structure.

Each reinforcing layer of the piece STD and of the piece INV was obtained by cutting it with an angle equal to 27° from a fabric of elastomeric material comprising a plurality of respective metallic reinforcing cords.

The metallic reinforcing cords of the piece STD had construction 2×0.30 HT (thus obtained by twisting together two HT steel wires having a diameter equal to 0.30 mm) and braking load equal to 454 N. Each reinforcing layer of the piece STD had a thread count equal to 104.

The metallic reinforcing cords of the piece INV had construction 32+2×0.28 ST (thus obtained by twisting together a textile yarn, then removed, comprising 32 filaments and two ST steel wires having a diameter equal to 0.28 mm) and braking load equal to 380 N. Each reinforcing layer of the piece STD had a thread count equal to 104.

The piece STD was preloaded under traction with a load equal to 10.53 Kg and subjected to dynamic compression cycles until a metallic reinforcing cord present in the piece STD broke.

The piece INV was preloaded under traction with a load equal to 8.81 Kg and subjected to various dynamic compression cycles until a metallic reinforcing cord present in the piece INV broke.

In the piece STD the aforementioned breaking occurred after having applied 4100 stress cycles, whereas in the piece INV the aforementioned breaking occurred after having applied 5320 stress cycles, thus showing for the piece INV behavior under fatigue better than that of the piece STD.

According to the Applicant, the better behavior under fatigue of the piece INV is due to the greater penetration of the elastomeric material inside the metallic reinforcing cords of the invention, and between the aforementioned metallic cords, with respect to what happens in the piece STD, in which conventional metallic reinforcing cords are used. In fact, due to such a greater penetration, the possibility of having a friction of the various metallic wires with each other is reduced or eliminated, such a friction causing overheating of the elastomeric material present in the piece and a reduction of the resistance to compression of the piece of elastomeric material.

According to the Applicant, the greater penetration of the elastomeric material inside the metallic reinforcing cords of the invention should also result in a reduction of the risks of detachment between reinforcing cords and metallic material. This occurs also at the ends of the reinforcing cords arranged in the crossed belt structure. In other words, that is at the areas where typically the aforementioned detachment takes place. This is confirmed by the good behavior under fatigue found with the tests described above. Due to such a good behavior under fatigue there should indeed be a good resistance to the stresses which are present at the ends of the reinforcing cords of the belt structure, to the benefit of the structural integrity of the tyre at such areas.

The Applicant has also carried out tests adapted to verify that in the metallic reinforcing cords according to the invention the removal of the textile yarn while the metallic reinforcing cord is being made does not negatively influence the adhesion capability of the metallic reinforcing cord to the surrounding elastomeric material.

The adhesion tests were carried out in accordance with the standards ASTM D2229-10 and BISFA E12.

For this purpose, the Applicant made 120 samples of metallic reinforcing cords according to the invention.

Half of the aforementioned samples of cord were obtained by twisting together the metallic wires and the textile yarn and subsequently removing the textile yarn through a hot water jet at 65°.

The other half of the aforementioned samples of cord were obtained by unrolling the textile yarn from the metallic wires through a mechanical twisting process.

The Applicant made the following 4 blocks of elastomeric material each including 15 of the aforementioned samples of cord:

block 1: thickness 12.5 mm, height 10 mm, length 200 mm;
block 2: thickness 12.5 mm, height 12.5 mm, length 200 mm;
block 3: thickness 12.5 mm, height 20 mm, length 200 mm;
block 4: thickness 12.5 mm, height 25 mm, length 200 mm.

The elastomeric material used to make the aforementioned blocks was as in the table below, where the ingredients are expressed in phr (parts per hundred of rubber):

| Ingredient | Amount (phr) |
| --- | --- |
| NR | 50 |
| SBR | 50 |
| Carbon Black | 55 |
| Plasticizer | 9 |
| Protective agent | 1 |
| Vulcanizing agent | 3 |
| Stearic Acid | 3 |
| Zinc Oxide | 4 |
| Accelerant | 1.25 |
| Retardant | 0.4 |

Hereinbelow, for each of the aforementioned ingredients, details and respective suppliers are given:

NR: Natural Rubber—SIR 20—Standard Indonesia Rubber
SBR: Styrene Butadiene Rubber—EUROPRENE® 1723 E-SBR—Versalis
Carbon Black: N330—Birla
Plasticizer: Olio MES Vivatec 200—Hansen & Rosenthal KG
Protective agent: 2,2,4-trimethyl-1,2-dihydroquinoline polymerized (TMQ) Vulkanox HS/LG—Lanxess GmbH.
Vulcanizing agent: Insoluble Sulfur Multisperse S-IS70P—Omya S.p.A.
Stearic Acid: Radiacid 444—Oleon NV.
Zinc Oxide: Zinc oxide—Zincolossidi
Accelerant: MBTS: 2,2' dibenzothiazyl disulfide—Rhenogran MTBS-80—Rhein Chemie GmbH
Retardant: PVI cyclohexyl thiophthalimide—Santogard PVI—Flexsys.

Thereafter, such blocks were vulcanized at 151° C., for 40 minutes, with a minimum pressure equal to 1.14 MPa in a vulcanization press made in accordance with standard ASTM D2229-10.

Thereafter, the maximum pull out force necessary to extract the samples of cord from the respective blocks was measured, with an approximation of 5 N, after having kept the blocks at a temperature of 23±5° C., with a relative humidity not greater than 50%, for a predetermined waiting time comprised between 16 hours and 72 hours.

The aforementioned pull out force was measured by setting a speed of application of the force equal to 100 mm/min.

In the samples in which the textile yarn was extracted through a jet of hot water, the aforementioned pull out force was equal to 318 N.

In the samples in which the textile yarn was extracted through a mechanical twisting process, the aforementioned pulling force was equal to 389 N.

The degree of coverage of the sample in the segment extracted from the block was also visually evaluated, giving a vote in percentage comprised between 0%, indicative of a situation in which the sample of cord extracted is completely free from elastomeric material and 100%, indicative of a situation in which the sample of cord extracted is totally covered by the elastomeric material.

In the samples in which the textile yarn was extracted through a jet of hot water, the aforementioned degree of coverage was evaluated to be equal to 83%.

In the samples in which the textile yarn was extracted through a mechanical twisting process, the aforementioned degree of coverage was evaluated to be equal to 98%.

The Applicant has observed that the values of pull out force and degree of coverage in the two cases discussed above are not very different from one another, confirming the fact that the removal of the textile yarn does not influence the adhesion capability of the metallic reinforcing cord to the elastomeric material.

The present invention has been described with reference to some preferred embodiments thereof. Various modifications can be made to the embodiments described above, still remaining within the scope of protection of the invention, which is defined by the following claims.

The invention claimed is:

1. A metallic reinforcing cord for tyres for vehicle wheels, consisting of:
from two to ten metallic wires twisted together and having a predetermined diameter, wherein, in at least some cross sections of the metallic reinforcing cord, at least two of the metallic wires are arranged to a minimum mutual distance greater than, or equal to, 2.5 times the predetermined diameter.

2. The metallic reinforcing cord according to claim 1, wherein, in at least one cross section thereof, at least some of the metallic wires are in contact with each other.

3. The metallic reinforcing cord according to claim 1, wherein, in any cross section thereof, the at least two metallic wires are spaced apart from one another.

4. The metallic reinforcing cord according to claim 1, wherein each of the metallic wires extends along a respective helix.

5. The metallic reinforcing cord according to claim 1, wherein the predetermined diameter ranges from 0.04 mm to 0.60 mm.

6. The metallic reinforcing cord according to claim 1, wherein the reinforcing cord comprises between two and six metallic wires.

7. The metallic reinforcing cord according to claim 1, wherein the metallic wires are twisted together with a twisting pitch ranging from 2 mm to 50 mm.

8. The metallic reinforcing cord according to claim 1, wherein the reinforcing cord has a part load elongation greater than, or equal to, 1%.

9. The metallic reinforcing cord according to claim 1, wherein the reinforcing cord has an elongation at break greater than, or equal to, 4.5%.

10. A tyre for vehicle wheels, comprising at least one reinforcing layer delimited by two opposite interface surfaces (S1, S2) and a plurality of metallic reinforcing cords arranged between the two opposite interface surfaces (S1, S2), wherein at least some of the metallic reinforcing cords are metallic reinforcing cords according to claim 1.

11. The tyre (100) according to claim 10, wherein in at least some cross sections of the at least one reinforcing layer at least one of the metallic wires has a distance from one of the opposite interface surfaces (S1, S2) less than or equal to the diameter of the metallic wires.

12. A metallic reinforcing cord for tyres for vehicle wheels, consisting of:
   from two to ten metallic wires twisted together and having a predetermined diameter, wherein, in at least some cross sections of the metallic reinforcing cord, at least two adjacent wires of the metallic wires are arranged to a minimum mutual distance greater than, or equal to, 2.5 times the predetermined diameter;
   wherein the at least two adjacent wires are arranged so that a line that joins their centers does not intersect further wires, wherein said line diametrically cuts the outer surface of said two adjacent wires at two diametrically opposite points and said minimum mutual distance is measured along said line between the points that, among the two diametrically opposite points of each of said two adjacent wires, are closest to each other.

13. A metallic reinforcing cord for tyres for vehicle wheels, consisting of:
   from two to ten metallic wires twisted together and having a predetermined diameter, wherein, in at least some cross sections of the metallic reinforcing cord, at least two of the metallic wires are arranged to a minimum mutual distance greater than, or equal to, 2.5 times the predetermined diameter;
   wherein the reinforcing cord has a part load elongation, evaluated with the BISFA E7 method, greater than, or equal to, 2%.

* * * * *